United States Patent
Zhang et al.

(10) Patent No.: US 11,177,853 B2
(45) Date of Patent: Nov. 16, 2021

(54) INFORMATION TRANSMISSION METHOD AND APPARATUS

(71) Applicant: XI'AN ZHONGXING NEW SOFTWARE CO., LTD., Xi'an (CN)

(72) Inventors: Wen Zhang, Guangdong (CN); Shuqiang Xia, Guangdong (CN); Kun Liu, Guangdong (CN); Xianghui Han, Guangdong (CN); Bo Dai, Guangdong (CN); Jing Shi, Guangdong (CN); Xianming Chen, Guangdong (CN); Huiying Fang, Guangdong (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 353 days.

(21) Appl. No.: 15/775,950

(22) PCT Filed: Nov. 11, 2016

(86) PCT No.: PCT/CN2016/105475
§ 371 (c)(1),
(2) Date: Sep. 12, 2018

(87) PCT Pub. No.: WO2017/080510
PCT Pub. Date: May 18, 2017

(65) Prior Publication Data
US 2019/0028143 A1   Jan. 24, 2019

(30) Foreign Application Priority Data

Nov. 13, 2015   (CN) .................... 201510776548.X
May 13, 2016   (CN) ...................... 201610323158.1

(51) Int. Cl.
*H04B 1/7143*   (2011.01)
*H04L 5/00*   (2006.01)
(Continued)

(52) U.S. Cl.
CPC ......... *H04B 1/7143* (2013.01); *H04L 5/0044* (2013.01); *H04W 72/042* (2013.01);
(Continued)

(58) Field of Classification Search
CPC ... H04B 1/7143; H04L 5/0044; H04L 5/0053; H04L 5/1469; H04W 74/0833; H04W 74/04; H04W 72/042; H04W 72/0466
See application file for complete search history.

(56) References Cited

U.S. PATENT DOCUMENTS

| | | | |
|---|---|---|---|
| 7,339,906 B1* | 3/2008 | Dahlby | H04W 76/10 370/329 |
| 2010/0284363 A1* | 11/2010 | Ahn | H04B 7/12 370/330 |

(Continued)

FOREIGN PATENT DOCUMENTS

| | | |
|---|---|---|
| CN | 1956432 A | 5/2007 |
| CN | 101325432 | 12/2008 |

(Continued)

OTHER PUBLICATIONS

Translation of CN1956432A, May 2, 2007, Espacenet, all pages (Year: 2007).*

(Continued)

*Primary Examiner* — Saumit Shah
(74) *Attorney, Agent, or Firm* — Knobbe Martens Olson & Bear LLP

(57) ABSTRACT

Provided are an information transmission method and apparatus, which relate to wireless communication. The method includes determining a frequency hopping pattern; and sending uplink information on a specified physical resource block (PRB) according to the frequency hopping pattern, or receiving or detecting downlink information on the specified PRB according to the frequency hopping pattern. The fre- (Continued)

---

Determine a frequency hopping pattern

Send uplink information on a specified PRB according to the frequency hopping pattern, or receive or detect downlink information on the specified PRB according to the frequency hopping pattern quency hopping pattern is determined according to at least one of the following information: a time domain frequency hopping granularity; an available subframe set; an available subband set; a time division duplex (TDD) uplink and downlink configuration; a number of PRBs included in each available subband; and an cell identifier of a cell in which a terminal currently resides.

33 Claims, 5 Drawing Sheets

(51) Int. Cl.
*H04W 72/04* (2009.01)
*H04W 74/04* (2009.01)
*H04W 74/08* (2009.01)
*H04L 5/14* (2006.01)

(52) U.S. Cl.
CPC ....... *H04W 74/04* (2013.01); *H04W 74/0833* (2013.01); *H04L 5/0053* (2013.01); *H04L 5/1469* (2013.01); *H04W 72/0466* (2013.01)

(56) References Cited

U.S. PATENT DOCUMENTS

| | | | | |
|---|---|---|---|---|
| 2011/0019636 | A1 | 1/2011 | Fukuoka et al. | |
| 2011/0026564 | A1* | 2/2011 | Arvidsson | H04L 5/0094 375/133 |
| 2011/0124347 | A1* | 5/2011 | Chen | H04W 64/00 455/456.1 |
| 2011/0294529 | A1* | 12/2011 | Luo | H04L 5/0035 455/509 |
| 2014/0177490 | A1* | 6/2014 | Sahara | H04L 5/00 370/280 |
| 2014/0211735 | A1* | 7/2014 | Nanri | H04W 24/08 370/329 |
| 2015/0256403 | A1 | 9/2015 | Li et al. | |
| 2015/0373626 | A1* | 12/2015 | Yi | H04W 24/08 375/132 |

FOREIGN PATENT DOCUMENTS

| | | | |
|---|---|---|---|
| CN | 102158253 | 8/2011 | |
| CN | 103716841 | 4/2014 | |
| CN | 104796845 | 7/2015 | |
| EP | 2486691 B1 * | 3/2019 | .......... H04L 5/0053 |
| WO | WO 2009/119067 | 10/2009 | |
| WO | WO 2013/104119 | 7/2013 | |

OTHER PUBLICATIONS

International Search Report for International Application No. PCT/CN2016/105475 dated Jan. 24, 2017 in 2 pages.

Office Action of corresponding Chinese Patent Application No. 201610323158.1 and its English Translation—19 pages (dated Jun. 15, 2020).

* cited by examiner

INFORMATION TRANSMISSION METHOD AND APPARATUS

CROSS REFERENCE TO RELATED APPLICATIONS

This application is U.S. National Phase Application, filed under 35 U.S.C. § 371, of International Patent Application No. PCT/CN2016/105475, filed on Nov. 11, 2016, which claims priority to Chinese patent application No. 201510776548.X filed on Nov. 13, 2015 and Chinese patent application No. 201610323158.1 filed on May 13, 2016, the entire disclosure of each of which is incorporated herein by reference.

TECHNICAL FIELD

The present disclosure relates to wireless communication and, in particular, to an information transmission method and apparatus.

BACKGROUND

Machine Type Communication (MTC) user equipment (UE), also referred to as Machine to Machine (M2M) user communication equipment, is currently the primary application form of the Internet of Things.

In recent years, more and more mobile operators have chosen Long-Term Evolution Advance (LTE/LTE-A) as the evolution direction of the broadband wireless communication system for the high spectral efficiency of LTE/LTE-A. Various MTC data services based on LTE/LTE-A will also be more attractive.

MTC equipment is usually low-cost and is featured by a small Radio Frequency (RF) bandwidth and a single receiving antenna with a transmitting and receiving bandwidth of 1.4 MHz. One type of MTC equipment, e.g., electricity meters, may be placed in metal cabinets in basements and can hardly be covered. A project in 3rd Generation Partnership Project (3GPP) R12 and R13 provides solutions for low-cost MTC UEs requiring coverage enhancement. The current solution to coverage enhancement is to improve coverage by extensive repetition of certain channels. One way to reduce the number of repetitions of a channel is to perform frequency hopping in the frequency domain for the channel to obtain the frequency diversity gain. The existing Physical Uplink Shared Channel (PUSCH) frequency hopping method is used for frequency hopping in a subframe or between retransmitting subframes and not for a repeated channel.

SUMMARY

Embodiments of the present disclosure provide an information transmission method and apparatus, which can be used for frequency hopping on a repeated channel.

An information transmission method includes:
determining a frequency hopping pattern; and
sending uplink information on a specified physical resource block (PRB) according to the frequency hopping pattern, or receiving or detecting downlink information on the specified PRB according to the frequency hopping pattern.

The frequency hopping pattern is determined according to at least one of the following information:
a time domain frequency hopping granularity;
an available subframe set;
an available subband set;
a time division duplex (TDD) uplink and downlink configuration;
a number of PRBs included in each available subband; and
a cell identifier of a cell in which a terminal currently resides.

In an embodiment, the available subband set is obtained according to received offset information and/or bitmap information of the available subbands sent by an eNB.

In an embodiment, when the available subband set is obtained according to the offset information, the method includes:
determining the available subband set according to the offset information and a number of the available subbands included in the available subband set sent by the eNB.

In an embodiment, the method further includes:
dividing a system bandwidth into a plurality of subbands according to a preset mode or dividing a system bandwidth obtained from the offset information into a plurality of subbands according to the preset mode.

In an embodiment, the frequency hopping pattern is determined according to at least one of the following information:
a number of repetitions corresponding to a lowest repetition level of the uplink information or the downlink information;
a number of repetitions corresponding to a repetition level of the uplink information or the downlink information;
a number of repetitions corresponding to a lowest repetition level of an uplink channel or a downlink channel with a smallest number of repetitions among an uplink channel or a downlink channel that uses a same frequency hopping pattern;
a number of repetitions of one repeated transmission and a number of frequency hopping subbands of the one repeated transmission;
the cell identifier of the cell in which the terminal currently resides; and
the TDD uplink and downlink configuration in a TDD system.

In an embodiment, when the time domain frequency hopping granularity is determined according to the TDD uplink and downlink configuration in the TDD system,
for the uplink channel, the time domain frequency hopping granularity is less than or equal to a number of consecutive uplink subframes in the TDD uplink and downlink configuration, or equal to an integral multiple of the number of the consecutive uplink subframes; and
for the downlink channel, the time domain frequency hopping granularity is less than or equal to a number of consecutive downlink subframes in the TDD uplink and downlink configuration, or equal to an integral multiple of the number of the consecutive downlink subframes.

In an embodiment, in a TDD system, the time domain frequency hopping granularity is an uplink/downlink switching period or an integral multiple of the uplink/downlink switching period.

In an embodiment, the uplink information includes at least one of the followings: uplink data, uplink control information, and physical random access channel (PRACH) information; and the downlink information includes downlink control information and/or downlink data.

In an embodiment, the specified PRB is determined according to a PRB position of a UE before a latest frequency hopping.

In an embodiment, in the step of sending the uplink information on the specified PRB according to the frequency hopping pattern, or receiving or detecting the downlink information on the specified PRB according to the frequency hopping pattern, the frequency hopping pattern of the uplink data and the frequency hopping pattern of the uplink control information have a same frequency domain frequency hopping rule, or the frequency hopping pattern of the uplink data and the frequency hopping pattern of a PRACH have a same frequency domain frequency hopping rule, or the frequency hopping pattern of the uplink control information and the frequency hopping pattern of the PRACH have a same frequency domain frequency hopping rule, or the frequency hopping pattern of the downlink control information and the frequency hopping pattern of the downlink data have a same frequency domain frequency hopping rule, or the frequency hopping pattern of the downlink control information and the frequency hopping pattern of the downlink data excluding one or more system information blocks (SIBs) have a same frequency domain frequency hopping rule; and in a TDD system, the frequency hopping pattern for sending the downlink information and the frequency hopping pattern for sending the uplink information are the same.

In an embodiment, frequency hopping occurs in the frequency hopping pattern in at least one of the following subframes:

in a TDD system, in the frequency hopping pattern, the frequency hopping occurs in an uplink/downlink switching subframe;

in the frequency hopping pattern, the frequency hopping occurs in a subframe determined by the cell identifier of the cell in which the terminal currently resides; and in the frequency hopping pattern, the frequency hopping occurs in a subframe outside the available subband set.

In an embodiment, in the frequency hopping pattern, a subband where the specified PRB is located before frequency hopping and a subband where the specified PRB is located after the frequency hopping satisfy one of the followings:

a sum of an index of the subband where the specified PRB is located before the frequency hopping and an index of the subband where the specified PRB is located after the frequency hopping is a fixed value;

the index of the subband where the specified PRB is located after the frequency hopping is: (the index of the subband where the specified PRB is located before the frequency hopping+a constant) mod a number of available subbands in the available subframe set;

the index of the subband where the specified PRB is located after the frequency hopping is: (the index of the subband where the specified PRB is located before the frequency hopping+a frequency hopping factor) mod the number of the available subbands in the available subframe set;

the index of the subband where the specified PRB is located after the frequency hopping is calculated from a preset interleaving function executed on the index of the subband where the specified PRB is located before the frequency hopping; and a sum of the index of the subband where the specified PRB is located and 1 is: [(the index of the subband where the specified PRB is located before the frequency hopping+1)×a constant c] mod a fixed value, where the fixed value is ($N_{sb}$+1), $N_{sb}$ denotes the number of the available subbands in the available subframe set, and c is relatively prime to $N_{sb}$.

The index of the subband is an index after the subbands in the available subframe set are numbered from 0 according to a preset sequence.

In an embodiment, in the frequency hopping pattern, the specified PRB before frequency hopping and the specified PRB after the frequency hopping satisfy one of the followings:

a sum of an index of the specified PRB after the frequency hopping and an index of the specified PRB before the frequency hopping is: (an index of the specified PRB before the frequency hopping mod $N_{RB}^{sb}$)×2+a number of PRBs included in ($N_{sb}$−1) subbands, where $N_{RB}^{sb}$ denotes the number of PRBs included in a subband and $N_{sb}$ denotes a number of available subbands in the available subframe set;

a sum of the index of the specified PRB after the frequency hopping and the index of the specified PRB before the frequency hopping is a constant;

the index of the specified PRB after the frequency hopping is: (the index of the specified PRB before the frequency hopping+a constant) mod a number of PRBs included in the available subbands in the available subframe set;

the index of the specified PRB after the frequency hopping is: (the index of the specified PRB before the frequency hopping+a frequency hopping factor) mod the number of the PRBs included in the available subbands in the available subframe set;

a difference between the index of the specified PRB after the frequency hopping and the index of the specified PRB before the frequency hopping is: (a first value−a number calculated from a preset interleaving function executed on the first value)×$N_{RB}^{sb}$, where the first value is the index of the specified PRB before the frequency hopping divided by $N_{RB}^{sb}$ and then rounded down;

a difference between the index of the specified PRB after the frequency hopping and the index of the specified PRB before the frequency hopping is: (a second value−a number calculated from the preset interleaving function executed on the second value)×$N_{RB}^{sb}$, where the second value is the index of the specified PRB before the frequency hopping divided by $N_{RB}^{sb}$ and then rounded down; and the index of the specified PRB after the frequency hopping is: (a third value−a fourth value)×$N_{RB}^{sb}$, where the third value is the index of the specified PRB before the frequency hopping divided by $N_{RB}^{sb}$ and then rounded down, the fourth value is: [(the third value+1)×c] mod a fixed value−1, the fixed value is ($N_{sb}$+1), and c is relatively prime to $N_{sb}$, where the index of the PRB is an index after the PRBs in the available subframe set are numbered from 0 according to a preset sequence.

In an embodiment, the frequency hopping factor is initialized according to at least one of the following information:

the cell identifier of the cell in which the terminal currently resides;

an information type of the uplink information or the downlink information;

the time domain frequency hopping granularity; and a UE identifier.

In an embodiment, in a subframe for sending a PRACH, when a PRB position corresponding to the frequency hopping pattern for sending the uplink data coincides or coincides in part with frequency domain resources of the PRACH, the uplink data is caused to hop to and sent on another available subband or the uplink data is not sent in the subframe for sending the PRACH.

In an embodiment, a repetition level of the uplink data is not lower than or not higher than a repetition level of the PRACH.

In an embodiment, in a subframe for sending a system information block (SIB) and/or a physical broadcast channel and/or a paging message and/or downlink control information for scheduling the paging message, when the specified PRB corresponding to the frequency hopping pattern for sending the downlink data or the downlink control information coincides or coincides in part with the PRB or a subband where the SIB and/or the physical broadcast channel and/or the paging message and/or the downlink control information for scheduling the paging message is located, the downlink data or the downlink control information is caused to hop to and sent on another available subband, or the downlink data or the downlink control information is not sent in the subframe.

In an embodiment, the method includes that: the number of repetitions of transmission of the uplink information or the downlink information is adjusted according to $N_{rep}$ in a preset or notified mode, where $N_{rep}$ denotes the number of repetitions and $N_{rep}$ is preset or is notified by an eNB.

In an embodiment, the method includes that: an aggregation level of transmission of the downlink control information is adjusted according to C in a preset or notified mode, where C denotes the aggregation level and is preset or is notified by an eNB.

In an embodiment, in a TDD system, when the uplink data or the uplink control information is sent according to the frequency hopping pattern, the downlink control information is not received, or the downlink control information is caused to hop to and received in a same narrowband as the uplink data or the uplink control information.

In an embodiment, when a PRACH is sent according to the frequency hopping pattern, the downlink control information is not received, or the downlink control information is caused to hop to and received in a same narrowband as the PRACH.

In an embodiment, the method includes that: the frequency hopping pattern of the downlink information or the uplink information of a UE without coverage enhancement is the same as the frequency hopping pattern of the downlink information or the uplink information of the UE with coverage enhancement.

In an embodiment, a change cycle of a redundancy version (RV) and/or a scrambling sequence of the downlink information or the uplink information is Z subframes.

In an embodiment, the change cycle Z is determined according to at least one of the following information:

a number of repetitions of the downlink information or the uplink information;

the time domain frequency hopping granularity; and whether frequency hopping exists in the frequency hopping pattern.

In an embodiment, the change cycle Z is determined according to one of the following modes:

mode 1: Z is equal to R or R/(4k) or R/(4k) rounded down or R/(4k) rounded up, where R is the number of repetitions of the uplink information or the downlink information and k is a positive integer;

mode 2: Z is 1 or 2 or 4;

mode 3: Z is equal to 5k or 10k, where k is the positive integer;

mode 4: $Z \in \{Y, Y/2, Y/2$ rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2$\}$, where Y is the time domain frequency hopping granularity; and a minimum value of any two of modes 1, 2, 3 and 4.

In an embodiment, when no frequency hopping exists in the frequency hopping pattern, the change cycle Z is determined according to one of the following modes:

mode 1: Z is equal to R or R/(4k) or R/(4k) rounded down or R/(4k) rounded up, where R is the number of repetitions of the uplink information or the downlink information and k is a positive integer;

mode 2: Z is 1 or 2 or 4;

mode 3: Z is equal to 5k or 10k, where k is the positive integer; and a minimum value of any two modes 1, 2 and 3;

when the frequency hopping exists in the frequency hopping pattern, the change cycle Z is determined according to one of the following modes:

mode 1: Z is equal to R or R/(4k) or R/(4k) rounded down or R/(4k) rounded up, where R is the number of repetitions of the uplink information or the downlink information and k is a positive integer;

mode 2: Z is 1 or 2 or 4;

mode 3: Z is equal to 5k or 10k, where k is the positive integer;

mode 4: $Z \in \{Y, Y/2, Y/2$ rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2$\}$, where Y is the time domain frequency hopping granularity; and a minimum value of any two of modes 1, 2, 3 and 4.

In an embodiment, the method further includes: determining a transmission gap and/or a transmission cycle.

The sending the uplink information on the specified PRB according to the frequency hopping pattern includes:

sending the uplink information on the specified PRB according to the transmission gap and/or the transmission cycle and the frequency hopping pattern.

The receiving or detecting the downlink information on the specified PRB according to the frequency hopping pattern includes:

receiving or detecting the downlink information on the specified PRB according to the transmission gap and/or the transmission cycle and the frequency hopping pattern.

In an embodiment, the transmission cycle includes the transmission gap or does not include the transmission gap.

In an embodiment, the transmission gap or the transmission cycle is preset or is configured by an eNB.

In an embodiment, the transmission gap or the transmission cycle is obtained through received downlink control information (DCI), radio resource control (RRC) signaling or SIB.

In an embodiment, a subframe corresponding to the transmission gap or the transmission cycle is preset or is determined based on a starting subframe of transmission.

In an embodiment, transmission is performed according to one of the following modes:

starting from a starting subframe of the transmission, the transmission is stopped in y subframes each time after the transmission is performed in x subframes, until the transmission is completed;

starting from the starting subframe of the transmission, the transmission is stopped in y subframes each time after the transmission is performed in (x-y) subframes, until the transmission is completed; and starting from the starting subframe of the transmission, the transmission is stopped in y subframes each time after the transmission is performed in a subframes, until the transmission is completed, where $$a = \left\lfloor \frac{N}{\lceil N/x \rceil} \right\rfloor \text{ or } \left\lceil \frac{N}{\lceil N/x \rceil} \right\rceil \text{ or } \left\lfloor \frac{N}{\lceil N/(x-y) \rceil} \right\rfloor \text{ or } \left\lceil \frac{N}{\lceil N/(x-y) \rceil} \right\rceil.$$

The transmission cycle is x subframes, the transmission gap is y subframes, N denotes a total number of transmitting subframes, $\lfloor \ \rfloor$ denotes rounding down and $\lceil \ \rceil$ denotes rounding up.

In an embodiment, the number of subframes corresponding to the transmission gap or the transmission cycle is one of the following:

an integer power of 2;
a multiple of 2 or 4 or 8 or 16;
an integral multiple of a maximum time domain frequency hopping granularity;
an integral multiple of 60; and
an integral multiple of 100.

In an embodiment, in the frequency hopping pattern, frequency hopping occurs after transmission is performed in p subframes starting from a first subframe after the transmission gap.

In an embodiment, the p is one of the followings:
p is obtained according to the frequency hopping pattern with subframes in the transmission gap regarded as transmission time; and
the time domain frequency hopping granularity.

Preferably, in a first subframe after the transmission gap, a narrowband corresponding to the specified PRB is one of the followings:
the narrowband corresponding to the specified PRB is the same as a narrowband corresponding to a last subframe before the transmission gap;
the narrowband corresponding to the specified PRB is the a next frequency hopping narrowband corresponding to the narrowband corresponding to the last subframe before the transmission gap;
the narrowband corresponding to the specified PRB is the a frequency hopping narrowband obtained according to the frequency hopping pattern, with subframes in the transmission gap regarded as transmission time; and
the narrowband corresponding to the specified PRB is the indicated by an eNB.

In an embodiment, the subframes each is a physical subframe or an available subframe.

In an embodiment, a UE transmitting the information is a half-duplex UE.

Embodiments of the present disclosure further provide an information transmission method. The method includes:
determining a frequency hopping pattern; and
sending downlink information on a specified physical resource block (PRB) according to the frequency hopping pattern, or receiving or detecting uplink information on the specified PRB according to the frequency hopping pattern.

The frequency hopping pattern is determined according to at least one of the following information:
a time domain frequency hopping granularity;
an available subframe set;
an available subband set;
a time division duplex (TDD) uplink and downlink configuration;
a number of PRBs included in each available subband; and
a cell identifier of a cell in which a terminal currently resides.

Embodiments of the present disclosure further provide an information transmission apparatus. The apparatus includes:
a determination module, which is configured to determine a frequency hopping pattern; and
a communication module, which is configured to send uplink information on a specified physical resource block (PRB) according to the frequency hopping pattern, or receive or detect downlink information on the specified PRB according to the frequency hopping pattern.

The determination module is configured to determine the frequency hopping pattern according to at least one of the following information:
a time domain frequency hopping granularity;
an available subframe set;
an available subband set;
a time division duplex (TDD) uplink and downlink configuration;
a number of PRBs included in each available subband; and
a cell identifier of a cell in which a terminal currently resides.

In an embodiment, the determination module is further configured to obtain the available subband set according to received offset information and/or bitmap information of the available subbands sent by an eNB.

In an embodiment, the determination module is further configured to determine the available subband set according to the offset information and a number of the available subbands included in the available subband set.

In an embodiment, the apparatus further includes a dividing module.

The dividing module is configured to divide a system bandwidth into a plurality of subbands according to a preset mode or divide a system bandwidth obtained from the offset information into a plurality of subbands according to the preset mode.

In an embodiment, the determination module is further configured to determine the time domain frequency hopping granularity according to at least one of the following information:
a number of repetitions corresponding to a lowest repetition level of the uplink information or the downlink information;
a number of repetitions corresponding to a repetition level of the uplink information or the downlink information;
a number of repetitions corresponding to a lowest repetition level of an uplink channel or a downlink channel with a smallest number of repetitions among an uplink channel or a downlink channel that uses a same frequency hopping pattern;
a number of repetitions of one repeated transmission and a number of frequency hopping subbands of the one repeated transmission;
the cell identifier of the cell in which the terminal currently resides; and
the TDD uplink and downlink configuration in a TDD system.

In an embodiment, when the determination module determines the time domain frequency hopping granularity according to the TDD uplink and downlink configuration in the TDD system,
for the uplink channel, the time domain frequency hopping granularity is less than or equal to a number of consecutive uplink subframes in the TDD uplink and downlink configuration, or equal to an integral multiple of the number of the consecutive uplink subframes; and for the downlink channel, the time domain frequency hopping granularity is less than or equal to a number of consecutive downlink subframes in the TDD uplink and downlink configuration, or equal to an integral multiple of the number of the consecutive downlink subframes.

In an embodiment, determining the specified PRB by the determination module includes:

determining the specified PRB according to a PRB position of a UE before a latest frequency hopping.

In an embodiment, the communication module sends the uplink information by the communication module on the specified PRB according to the frequency hopping pattern, or receives or detects the downlink information by the communication module on the specified PRB according to the frequency hopping pattern as follows:

the frequency hopping pattern of the uplink data and the frequency hopping pattern of the uplink control information have a same frequency domain frequency hopping rule, or the frequency hopping pattern of the uplink data and the frequency hopping pattern of a PRACH have a same frequency domain frequency hopping rule, or the frequency hopping pattern of the uplink control information and the frequency hopping pattern of the PRACH have a same frequency domain frequency hopping rule, or the frequency hopping pattern of the downlink control information and the frequency hopping pattern of the downlink data have a same frequency domain frequency hopping rule, or the frequency hopping pattern of the downlink control information and the frequency hopping pattern of the downlink data excluding one or more system information blocks (SIBs) have a same frequency domain frequency hopping rule; and in a TDD system, the frequency hopping pattern for sending the downlink information and the frequency hopping pattern for sending the uplink information are the same.

In an embodiment, frequency hopping occurs in the frequency hopping pattern in at least one of the following subframes:

in a TDD system, in the frequency hopping pattern, the frequency hopping occurs in an uplink/downlink switching subframe;

in the frequency hopping pattern, the frequency hopping occurs in a subframe determined by the cell identifier of the cell in which the terminal currently resides; and in the frequency hopping pattern, the subframe where the frequency hopping occurs in a subframe outside the available subband set.

In an embodiment, in the frequency hopping pattern, a subband where the specified PRB is located before frequency hopping and a subband where the specified PRB is located after the frequency hopping satisfy one of the followings:

a sum of an index of the subband where the specified PRB is located before the frequency hopping and an index of the subband where the specified PRB is located after the frequency hopping is a fixed value;

the index of the subband where the specified PRB is located after the frequency hopping is: (the index of the subband where the specified PRB is located before the frequency hopping+a constant) mod a number of available subbands in the available subframe set;

the index of the subband where the specified PRB is located after the frequency hopping is: (the index of the subband where the specified PRB is located before the frequency hopping+a frequency hopping factor) mod the number of the available subbands in the available subframe set;

the index of the subband where the specified PRB is located after the frequency hopping is calculated from a preset interleaving function executed on the index of the subband where the specified PRB is located before the frequency hopping; and a sum of the index of the subband where the specified PRB is located and 1 is: [(the index of the subband where the specified PRB is located before the frequency hopping+1)×a constant c] mod a fixed value, where the fixed value is $(N_{sb}+1)$, $N_{sb}$ denotes the number of the available subbands in the available subframe set, and c is relatively prime to $N_{sb}$.

The index of the subband is an index after the subbands in the available subframe set are numbered from 0 according to a preset sequence.

In an embodiment, in the frequency hopping pattern, the specified PRB before frequency hopping and the specified PRB after the frequency hopping satisfy one of the followings:

a sum of an index of the specified PRB after the frequency hopping and an index of the specified PRB before the frequency hopping is: (an index of the specified PRB before the frequency hopping mod $N_{RB}^{sb}$)×2+a number of PRBs included in $(N_{sb}-1)$ subbands, where $N_{RB}^{sb}$ denotes the number of PRBs included in subbands and $N_{sb}$ denotes a number of available subbands in the available subframe set;

a sum of the index of the specified PRB after the frequency hopping and the index of the specified PRB before the frequency hopping is a constant;

the index of the specified PRB after the frequency hopping is: (the index of the specified PRB before the frequency hopping+a constant) mod a number of PRBs included in the available subbands in the available subframe set;

the index of the specified PRB after the frequency hopping is: (the index of the specified PRB before the frequency hopping+a frequency hopping factor) mod the number of the PRBs included in the available subbands in the available subframe set;

a difference between the index of the specified PRB after the frequency hopping and the index of the specified PRB before the frequency hopping is: (a first value–a number calculated from a preset interleaving function executed on the first value)×$N_{RB}^{sb}$, where the first value is the index of the specified PRB before the frequency hopping divided by $N_{RB}^{sb}$ and then rounded down;

a difference between the index of the specified PRB after the frequency hopping and the index of the specified PRB before the frequency hopping is: (a second value–a number calculated from the preset interleaving function executed on the second value)×$N_{RB}^{sb}$, where the second value is the index of the specified PRB before the frequency hopping divided by $N_{RB}^{sb}$ and then rounded down; and the index of the specified PRB after the frequency hopping is: (a third value–a fourth value)×$N_{RB}^{sb}$, where the third value is the index of the specified PRB before the frequency hopping divided by $N_{RB}^{sb}$ and then rounded down, the fourth value is: [(the third value+1)×c] mod a fixed value–1, the fixed value is $(N_{sb}+1)$, and c is relatively prime to $N_{sb}$.

The index of the PRB is an index after the PRBs in the available subframe set are numbered from 0 according to a preset sequence.

In an embodiment, the determination module initializes the frequency hopping factor according to at least one of the following information:

the cell identifier of the cell in which the terminal currently resides;

an information type of the uplink information or the downlink information;

the time domain frequency hopping granularity; and a UE identifier.

In an embodiment, in a subframe for sending a PRACH, when a PRB position corresponding to the frequency hopping pattern for sending the uplink data coincides or coincides in part with frequency domain resources of the PRACH, the communication module hops to another available subband and sends the uplink data, or does not send the uplink data in the subframe for sending the PRACH.

In an embodiment, in a subframe for sending a system information block (SIB) and/or a physical broadcast channel and/or a paging message and/or downlink control information for scheduling the paging message, when the specified PRB corresponding to the frequency hopping pattern for sending the downlink data coincides or coincides in part with a PRB or a subband where the SIB or PBCH or Paging is located, the communication module hops to another available subband and sends the downlink data, or does not send the downlink data.

In an embodiment, the number of repetitions of transmission of the uplink information or the downlink information of the communication module is adjusted according to $N_{rep}$ in a preset or notified mode, where $N_{rep}$ denotes the number of repetitions, and $N_{rep}$ is preset, notified by an eNB or configured by the eNB.

In an embodiment, an aggregation level of transmission of the downlink control information of the communication module is adjusted according to C in a preset or notified mode, where C denotes the aggregation level, and C is preset or notified by an eNB or configured by the eNB.

In an embodiment, in a TDD system, when sending the uplink data or the uplink control information according to the frequency hopping pattern, the communication module does not receive the downlink control information, or hops to a same narrowband as a PUSCH/PUCCH and receives an EPDCCH.

In an embodiment, when sending a non-contention PRACH according to the frequency hopping pattern, the communication module does not receive the downlink control information, or hops to a same narrowband as the PRACH and receives the downlink control information.

In an embodiment, a change cycle of a redundancy version (RV) and/or a scrambling sequence of the downlink information or the uplink information of the communication module is Z subframes.

In an embodiment, the determination module is further configured to determine the change cycle Z according to at least one of the following information:

a number of repetitions of the downlink information or the uplink information;

the time domain frequency hopping granularity; and whether frequency hopping exists in the frequency hopping pattern.

In an embodiment, the determination module determines the change cycle Z according to one of the following modes:

mode 1: Z is equal to R or R/(4k) or R/(4k) rounded down or R/(4k) rounded up, where R is the number of repetitions of the uplink information or the downlink information and k is a positive integer;

mode 2: Z is 1 or 2 or 4;

mode 3: Z is equal to 5k or 10k, where k is the positive integer;

mode 4: Z∈{Y, Y/2, Y/2 rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2}, where Y is the time domain frequency hopping granularity; and a minimum value of any two of modes 1, 2, 3 and 4.

In an embodiment, when no frequency hopping exists in the frequency hopping pattern, the determination module determines the change cycle Z according to one of the following modes:

mode 1: Z is equal to R or R/(4k) or R/(4k) rounded down or R/(4k) rounded up, where R is the number of repetitions of the uplink information or the downlink information and k is a positive integer;

mode 2: Z is 1 or 2 or 4;

mode 3: Z is equal to 5k or 10k, where k is the positive integer; and a minimum value of any two of modes 1, 2 and 3;

when the frequency hopping exists in the frequency hopping pattern, the determination module determines the change cycle Z according to one of the following:

mode 1: Z is equal to R or R/(4k) or R/(4k) rounded down or R/(4k) rounded up, where R is the number of repetitions of the uplink information or the downlink information and k is a positive integer;

mode 2: Z is 1 or 2 or 4;

mode 3: Z is equal to 5k or 10k, where k is the positive integer;

mode 4: Z∈{Y, Y/2, Y/2 rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2}, where Y is the time domain frequency hopping granularity; and a minimum value of any two of modes 1, 2, 3 and 4.

In an embodiment, the subframes each is a physical subframe or an available subframe.

In an embodiment, the determination module is further configured to determine a transmission gap and/or a transmission cycle.

The communication module sends the uplink information on the specified PRB according to the frequency hopping pattern as follows:

the communication module sends the uplink information on the specified PRB according to the transmission gap and/or the transmission cycle and the frequency hopping pattern.

The communication module receives or detects the downlink information on the specified PRB according to the frequency hopping pattern as follows:

the communication module receives or detects the downlink information on the specified PRB according to the transmission gap and/or the transmission cycle and the frequency hopping pattern.

In an embodiment, the determination module is further configured to obtain the transmission gap or the transmission cycle through received downlink control information (DCI), radio resource control (RRC) signaling or SIB.

In an embodiment, a subframe corresponding to the transmission gap or the transmission cycle is preset or is determined based on a starting subframe of transmission.

In an embodiment, the communication module performs transmission according to one of the following modes:

starting from a starting subframe of the transmission, the transmission is stopped in y subframes each time after the transmission is performed in x subframes, until the transmission is completed;

starting from the starting subframe of the transmission, the transmission is stopped in y subframes each time after the transmission is performed in (x-y) subframes, until the transmission is completed; and starting from the starting subframe of the transmission, the transmission is stopped in y subframes each time after the transmission is performed in a subframes, until the transmission is completed, where $$a = \left\lfloor \frac{N}{\lceil N/x \rceil} \right\rfloor \text{ or } \left\lceil \frac{N}{\lceil N/x \rceil} \right\rceil \text{ or } \left\lfloor \frac{N}{\lceil N/(x-y) \rceil} \right\rfloor \text{ or } \left\lceil \frac{N}{\lceil N/(x-y) \rceil} \right\rceil.$$

The transmission cycle is x subframes, the transmission gap is y subframes, N denotes a total number of transmitting subframes, $\lfloor \ \rfloor$ denotes rounding down and $\lceil \ \rceil$ denotes rounding up.

In an embodiment, in the frequency hopping pattern, frequency hopping occurs after transmission is performed in p subframes starting from a first subframe after the transmission gap.

Embodiments of the present disclosure further provide an information transmission apparatus. The apparatus includes:

a second determination module, which is configured to determine a frequency hopping pattern; and a second communication module, which is configured to send downlink information on a specified physical resource block (PRB) according to the frequency hopping pattern, or receive or detect uplink information on the specified PRB according to the frequency hopping pattern.

The frequency hopping pattern is determined according to at least one of the following information:

a time domain frequency hopping granularity;

an available subframe set;

an available subband set;

a time division duplex (TDD) uplink and downlink configuration;

a number of PRBs included in each available subband; and a cell identifier of a cell in which a terminal currently resides.

Compared with the related art, embodiments of the present disclosure have the beneficial effects described below The information transmission method and apparatus provided by embodiments of the present disclosure, which send uplink information on a specified digital mapping technique PRB according to a determined pattern, or receive or detect downlink information on the specified PRB according to the pattern, thus can be used for frequency hopping on a repeated channel.

DETAILED DESCRIPTION

Figure 8:
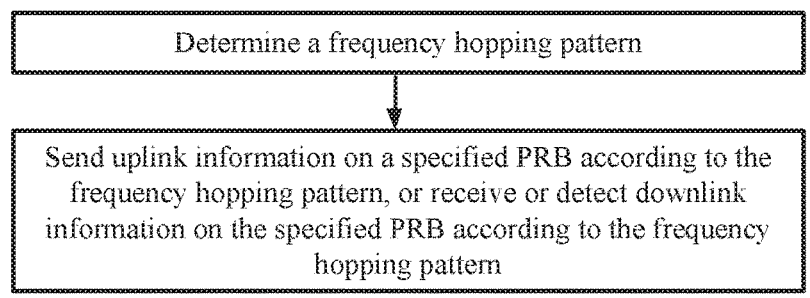
FIG. 8 is a flowchart of an information transmission method according to an embodiment of the present disclosure.

As shown in FIG. 8, embodiments of the present disclosure provide an information transmission method. The method includes:

determining a frequency hopping pattern; and sending uplink information on a specified physical resource block (PRB) according to the frequency hopping pattern, or receiving or detecting downlink information on the specified PRB according to the frequency hopping pattern.

The frequency hopping pattern is determined according to at least one of the following information:

a time domain frequency hopping granularity;

an available subframe set;

an available subband set;

a time division duplex (TDD) uplink and downlink configuration;

a number of PRBs included in each available subband; and a cell identifier of a cell in which a terminal currently resides.

The specified number of repetitions and/or the available subframe set and/or the available subband set and/or the number of PRBs included in each available subband is preset or is configured by an eNB.

When the available subband set is configured by the eNB, the available subband set is obtained according to received offset information and/or bitmap information of the available subbands sent by the eNB.

The offset information, in combination with the number of available subbands included in the available subframe set, may be used to determine the available subband set. The number of the available subbands included in the available subband set may be sent by the eNB or may be preset.

In an embodiment, before the available subband set is obtained according to the bitmap information and/or the offset information, the method includes:

dividing a system bandwidth into a plurality of subbands according to a preset mode or dividing a system bandwidth obtained from the offset information into a plurality of subbands according to the preset mode.

In an embodiment, the domain frequency hopping granularity is determined according to at least one of the following information:

a number of repetitions corresponding to a lowest repetition level of the uplink information or the downlink information;

a number of repetitions corresponding to a repetition level of the uplink information or the downlink information;

a number of repetitions corresponding to a lowest repetition level of an uplink channel or a downlink channel with a smallest number of repetitions among an uplink channel or a downlink channel that uses a same frequency hopping pattern;

a number of repetitions of one repeated transmission and a number of frequency hopping subbands of the one repeated transmission;

the cell identifier of the cell in which the terminal currently resides; and the TDD uplink and downlink configuration in a TDD system.

When the time domain frequency hopping granularity is determined according to the TDD uplink and downlink configuration in the TDD system, for the uplink channel, the time domain frequency hopping granularity is less than or equal to a number of consecutive uplink subframes in the TDD uplink and downlink configuration, or equal to an integral multiple of the number of the consecutive uplink subframes; and for the downlink channel, the time domain frequency hopping granularity is less than or equal to a number of consecutive downlink subframes in the TDD uplink and downlink configuration, or equal to an integral multiple of the number of the consecutive downlink subframes.

In the TDD system, the time domain frequency hopping granularity is an uplink/downlink switching period or an integral multiple of the uplink/downlink switching period. For example, the time domain frequency hopping granularity is 5 ms or an integral multiple of 5 ms.

The uplink information includes uplink data and/or uplink control information and/or physical random access channel (PRACH) information. The downlink information includes downlink control information and/or downlink data.

The specified PRB is determined according to a PRB position of a UE before latest frequency hopping.

The initial PRB position where the UE is located is preset or is configured by the eNB.

In the step of sending the uplink information on the specified PRB according to the frequency hopping pattern, or receiving or detecting the downlink information on the specified PRB according to the frequency hopping pattern, the frequency hopping pattern of the uplink data and the frequency hopping pattern of the uplink control information have a same frequency domain frequency hopping rule, or the frequency hopping pattern of the uplink data and the frequency hopping pattern of a PRACH have a same frequency domain frequency hopping rule, or the frequency hopping pattern of the uplink control information and the frequency hopping pattern of the PRACH have a same frequency domain frequency hopping rule, or the frequency hopping pattern of the downlink control information and the frequency hopping pattern of the downlink data have a same frequency domain frequency hopping rule, or the frequency hopping pattern of the downlink control information and the frequency hopping pattern of the downlink data excluding one or more system information blocks (SIBs) have a same frequency domain frequency hopping rule; and in a TDD system, the frequency hopping pattern for sending the downlink information and the frequency hopping pattern for sending the uplink information are the same.

The frequency hopping occurs in the frequency hopping pattern in at least one of the following subframes:

in a TDD system, in the frequency hopping pattern, the frequency hopping occurs in an uplink/downlink switching subframe;

in the frequency hopping pattern, the frequency hopping occurs in a subframe determined by the cell identifier of the cell in which the terminal currently resides; and in the frequency hopping pattern, the frequency hopping occurs in a subframe outside the available subband set.

In the frequency hopping pattern, a subband where the specified PRB is located before frequency hopping and a subband where the specified PRB is located after the frequency hopping satisfy one of the followings:

a sum of an index of the subband where the specified PRB is located before the frequency hopping and an index of the subband where the specified PRB is located after the frequency hopping is a fixed value;

the index of the subband where the specified PRB is located after the frequency hopping is: (the index of the subband where the specified PRB is located before the frequency hopping+a constant) mod a number of available subbands in the available subframe set;

the index of the subband where the specified PRB is located after the frequency hopping is: (the index of the subband where the specified PRB is located before the frequency hopping+a frequency hopping factor) mod the number of the available subbands in the available subframe set;

the index of the subband where the specified PRB is located after the frequency hopping is calculated from a preset interleaving function executed on the index of the subband where the specified PRB is located before the frequency hopping; and a sum of the index of the subband where the specified PRB is located and 1 is: [(the index of the subband where the specified PRB is located before the frequency hopping+1)×a constant c] mod a fixed value, where the fixed value is ($N_{sb}$+1), $N_{sb}$ denotes the number of the available subbands in the available subframe set, and c is relatively prime to $N_{sb}$.

The index of the subband is an index after the subbands in the available subframe set are numbered from 0 according to a preset sequence.

In the frequency hopping pattern, the specified PRB before frequency hopping and the specified PRB after the frequency hopping satisfy one of the followings:

a sum of an index of the specified PRB after the frequency hopping and an index of the specified PRB before the frequency hopping is: (an index of the specified PRB before the frequency hopping mod $N_{RB}^{sb}$)×2+a number of PRBs included in ($N_{sb}$−1) subbands, where $N_{RB}^{sb}$ denotes the number of PRBs included in a subband and $N_{sb}$ denotes a number of available subbands in the available subframe set;

a sum of the index of the specified PRB after the frequency hopping and the index of the specified PRB before the frequency hopping is a constant;

the index of the specified PRB after the frequency hopping is: (the index of the specified PRB before the frequency hopping+a constant) mod a number of PRBs included in the available subbands in the available subframe set;

the index of the specified PRB after the frequency hopping is: (the index of the specified PRB before the frequency hopping+a frequency hopping factor) mod the number of the PRBs included in the available subbands in the available subframe set;

a difference between the index of the specified PRB after the frequency hopping and the index of the specified PRB before the frequency hopping is: (a first value–a number calculated from a preset interleaving function executed on the first value)×$N_{RB}^{sb}$, where the first value is the index of the specified PRB before the frequency hopping divided by $N_{RB}^{sb}$ and then rounded down;

a difference between the index of the specified PRB after the frequency hopping and the index of the specified PRB before the frequency hopping is: (a second value–a number calculated from the preset interleaving function executed on the second value)×$N_{RB}^{sb}$, where the second value is the index of the specified PRB before the frequency hopping divided by $N_{RB}^{sb}$ and then rounded down; and the index of the specified PRB after the frequency hopping is: (a third value–a fourth value)×$N_{RB}^{sb}$, where the third value is the index of the specified PRB before the frequency hopping divided by $N_{RB}^{sb}$ and then rounded down, the fourth value is: [(the third value+1)×c] mod a fixed value–1, the fixed value is ($N_{sb}$+1), and c is relatively prime to $N_{sb}$.

The index of the PRB is an index after the PRBs in the available subframe set are numbered from 0 according to a preset sequence.

The frequency hopping factor is initialized according to at least one of the following information:

the cell identifier of the cell in which the terminal currently resides;

an information type of the uplink information or the downlink information;

the time domain frequency hopping granularity; and a UE identifier.

In a subframe for sending a PRACH, when a PRB position corresponding to the frequency hopping pattern for sending the uplink data coincides or coincides in part with frequency domain resources of the PRACH, the uplink data is caused to hop to and sent on another available subband or the uplink data is not sent in the subframe for sending the PRACH.

A repetition level of the uplink data is not lower than or not higher than a repetition level of the PRACH.

A subframe is sent on a system information block (SIB) and/or a physical broadcast channel and/or a paging message and/or downlink control information for scheduling the paging message and, when the specified PRB corresponding to the frequency hopping pattern for sending the downlink data coincides or coincides in part with a PRB or a subband where the SIB or PBCH or Paging is located, the communication module hops to another available subband and sends the downlink data, or does not send the downlink data.

The number of repetitions of transmission of the uplink information or the downlink information is adjusted according to $N_{rep}$ in a preset or notified mode, where $N_{rep}$ denotes the number of repetitions and $N_{rep}$ is preset or is notified by an eNB.

An aggregation level of transmission of the downlink control information is adjusted according to C in a preset or notified mode, where C denotes the aggregation level and is preset or is notified by an eNB.

In the TDD system, when the uplink data or the uplink control information is sent according to the frequency hopping pattern, the downlink control information is not received, or the downlink control information is caused to hop to and received in a same narrowband as the uplink data or the uplink control information.

When a non-contention PRACH is sent according to the frequency hopping pattern, the downlink control information is not received, or the downlink control information is caused to hop to and received in a same narrowband as the PRACH.

The frequency hopping pattern of the downlink information or the uplink information of a UE without coverage enhancement is the same as the frequency hopping pattern of the downlink information or the uplink information of the UE with coverage enhancement.

In an embodiment, a change cycle of a redundancy version (RV) and/or a scrambling sequence of the downlink information or the uplink information is Z subframes.

In an embodiment, the change cycle Z is determined according to at least one of the following information:

a number of repetitions of the downlink information or the uplink information;

the time domain frequency hopping granularity; and whether frequency hopping exists in the frequency hopping pattern.

In an embodiment, the change cycle Z is determined according to one of the following modes:

Z is equal to R or R/(4k) or R/(4k) rounded down or R/(4k) rounded up, where R is the number of repetitions of the uplink information or the downlink information and k is a positive integer;

Z is 1 or 2 or 4;

Z is equal to 5k or 10k, where k is the positive integer;

Z∈{Y, Y/2, Y/2 rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2}, where Y is the time domain frequency hopping granularity; and a minimum value of any two of preceding modes.

In an embodiment, when no frequency hopping exists in the frequency hopping pattern, the change cycle Z is determined according to one of the following modes:

Z is equal to R or R/(4k) or R/(4k) rounded down or R/(4k) rounded up, where R is the number of repetitions of the uplink information or the downlink information and k is a positive integer;

Z is 1 or 2 or 4;

Z is equal to 5k or 10k, where k is the positive integer; and a minimum value of any two of preceding modes;

when the frequency hopping exists in the frequency hopping pattern, the change cycle Z is determined according to one of the following modes:

Z is equal to R or R/(4k) or R/(4k) rounded down or R/(4k) rounded up, where R is the number of repetitions of the uplink information or the downlink information and k is a positive integer;

Z is 1 or 2 or 4;

Z is equal to 5k or 10k, where k is the positive integer;

Z∈{Y, Y/2, Y/2 rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2}, where Y is the time domain frequency hopping granularity; and a minimum value of any two of preceding modes.

In an embodiment, the subframes each is a physical subframe or an available subframe.

In an embodiment, the method further includes: determining a transmission gap and/or a transmission cycle.

The sending the uplink information on the specified PRB according to the frequency hopping pattern includes:

sending the uplink information on the specified PRB according to the transmission gap and/or the transmission cycle and the frequency hopping pattern.

The receiving or detecting the downlink information on the specified PRB according to the frequency hopping pattern includes:

receiving or detecting the downlink information on the specified PRB according to the transmission gap and/or the transmission cycle and the frequency hopping pattern.

In an embodiment, the transmission cycle includes the transmission gap or does not include the transmission gap.

In an embodiment, the transmission gap or the transmission cycle is preset or is configured by an eNB.

In an embodiment, the transmission gap or the transmission cycle is obtained through received downlink control information (DCI), radio resource control (RRC) signaling or SIB.

In an embodiment, a subframe corresponding to the transmission gap or the transmission cycle is preset or is determined based on a starting subframe of transmission.

Transmission is performed according to one of the following modes:

starting from a starting subframe of the transmission, the transmission is stopped in y subframes each time after the transmission is performed in x subframes, until the transmission is completed;

starting from the starting subframe of the transmission, the transmission is stopped in y subframes each time after the transmission is performed in (x-y) subframes, until the transmission is completed; and starting from the starting subframe of the transmission, the transmission is stopped in y subframes each time after the transmission is performed in a subframes, until the transmission is completed, where $$a = \left\lfloor \frac{N}{\lceil N/x \rceil} \right\rfloor \text{ or } \left\lceil \frac{N}{\lceil N/x \rceil} \right\rceil \text{ or } \left\lfloor \frac{N}{\lceil N/(x-y) \rceil} \right\rfloor \text{ or } \left\lceil \frac{N}{\lceil N/(x-y) \rceil} \right\rceil.$$

The transmission cycle is x subframes, the transmission gap is y subframes, N denotes a total number of transmitting subframes, ⌊ ⌋ denotes rounding down and ⌈ ⌉ denotes rounding up.

In an embodiment, the number of subframes corresponding to the transmission gap or the transmission cycle is one of the followings:

an integer power of 2;

a multiple of 2 or 4 or 8 or 16;

an integral multiple of a maximum time domain frequency hopping granularity;

an integral multiple of 60; and an integral multiple of 100.

In an embodiment, in the frequency hopping pattern, frequency hopping occurs after transmission is performed in p subframes starting from a first subframe after the transmission gap.

In an embodiment, the p is one of the followings:

p is obtained according to the frequency hopping pattern, with subframes in the transmission gap regarded as transmission time; and the time domain frequency hopping granularity.

In an embodiment, in a first subframe after the transmission gap, a narrowband corresponding to the specified PRB is one of the following:

the narrowband is the same as a narrowband corresponding to a last subframe before the transmission gap;

the narrowband is a next frequency hopping narrowband corresponding to the narrowband corresponding to the last subframe before the transmission gap;

the narrowband is a frequency hopping narrowband obtained according to the frequency hopping pattern, with subframes in the transmission gap regarded as transmission time; and the narrowband is indicated by an eNB.

The eNB indicates the narrowband in two modes: indicating through DCI or RRC.

In an embodiment, the subframes each is a physical subframe or an available subframe.

In an embodiment, a UE transmitting the information is a half-duplex UE.

Embodiments of the present disclosure further provide an information transmission method. The method includes:

determining a frequency hopping pattern; and sending downlink information on a specified physical resource block (PRB) according to the frequency hopping pattern, or receiving or detecting uplink information on the specified PRB according to the frequency hopping pattern.

The frequency hopping pattern is determined according to at least one of the following information:

a time domain frequency hopping granularity;

an available subframe set;

an available subband set;

a time division duplex (TDD) uplink and downlink configuration;

a number of PRBs included in each available subband; and a cell identifier of a cell in which a terminal currently resides.

Figure 9:
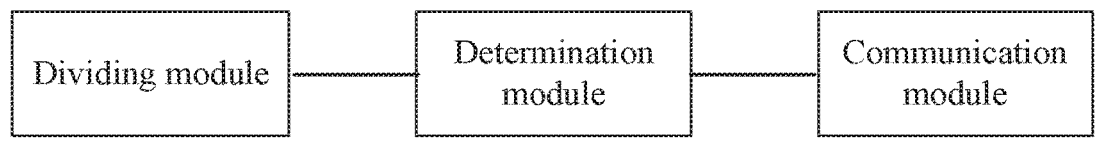
FIG. 9 is a structure diagram of an information transmission apparatus according to an embodiment of the present disclosure.

As shown in FIG. 9, embodiments of the present disclosure provide an information transmission apparatus. The apparatus includes:

a determination module, which is configured to determine a frequency hopping pattern; and a communication module, which is configured to send uplink information on a specified physical resource block (PRB) according to the frequency hopping pattern, or receive or detect downlink information on the specified PRB according to the frequency hopping pattern.

The determination module is configured to determine the frequency hopping pattern according to at least one of the following information:

a time domain frequency hopping granularity;

an available subframe set;

an available subband set;

a time division duplex (TDD) uplink and downlink configuration;

a number of PRBs included in each available subband; and a cell identifier of a cell in which a terminal currently resides.

The determination module is further configured to obtain the available subband set according to received offset information and/or bitmap information of the available subbands sent by an eNB.

The determination module is further configured to determine the available subband set according to the offset information and a number of the available subbands included in the available subband set.

The apparatus further includes a dividing module.

The dividing module is configured to divide a system bandwidth into a plurality of subbands according to a preset mode or divide a system bandwidth obtained from the offset information into a plurality of subbands according to the preset mode.

The determination module is further configured to determine the time domain frequency hopping granularity according to at least one of the following information:

a number of repetitions corresponding to a lowest repetition level of the uplink information or the downlink information;

a number of repetitions corresponding to a repetition level of the uplink information or the downlink information;

a number of repetitions corresponding to a lowest repetition level of an uplink channel or a downlink channel with a smallest number of repetitions among an uplink channel or a downlink channel that uses a same frequency hopping pattern;

a number of repetitions of one repeated transmission and a number of frequency hopping subbands of the one repeated transmission;

the cell identifier of the cell in which the terminal currently resides;

the TDD uplink and downlink configuration in a TDD system.

When the determination module determines the time domain frequency hopping granularity according to the TDD uplink and downlink configuration in the TDD system, for the uplink channel, the time domain frequency hopping granularity is less than or equal to a number of consecutive uplink subframes in the TDD uplink and downlink configuration, or equal to an integral multiple of the number of the consecutive uplink subframes; and for the downlink channel, the time domain frequency hopping granularity is less than or equal to a number of consecutive downlink subframes in the TDD uplink and downlink configuration, or equal to an integral multiple of the number of the consecutive downlink subframes.

The determination module determines the specified PRB as follows:

the determination module determines the specified PRB according to a PRB position of a UE before latest frequency hopping.

The determination module sends the uplink information by the communication module on the specified PRB according to the frequency hopping pattern, or receives or detects the downlink information by the communication module on the specified PRB according to the frequency hopping pattern as follows:

the frequency hopping pattern of the uplink data and the frequency hopping pattern of the uplink control information have a same frequency domain frequency hopping rule, or the frequency hopping pattern of the uplink data and the frequency hopping pattern of a PRACH have a same frequency domain frequency hopping rule, or the frequency hopping pattern of the uplink control information and the frequency hopping pattern of the PRACH have a same frequency domain frequency hopping rule, or the frequency hopping pattern of the downlink control information and the frequency hopping pattern of the downlink data have a same frequency domain frequency hopping rule, or the frequency hopping pattern of the downlink control information and the frequency hopping pattern of the downlink data excluding one or more system information blocks (SIBs) have a same frequency domain frequency hopping rule; and in a TDD system, the frequency hopping pattern for sending the downlink information and the frequency hopping pattern for sending the uplink information are the same.

The frequency hopping occurs in the frequency hopping pattern is at least one of the following subframes:

in a TDD system, in the frequency hopping pattern, the frequency hopping occurs in an uplink/downlink switching subframe;

in the frequency hopping pattern, the frequency hopping occurs in a subframe determined by the cell identifier of the cell in which the terminal currently resides; and in the frequency hopping pattern, the frequency hopping occurs is a subframe outside the available subband set.

In the frequency hopping pattern, a subband where the specified PRB is located before frequency hopping and a subband where the specified PRB is located after the frequency hopping satisfy one of the followings:

a sum of an index of the subband where the specified PRB is located before the frequency hopping and an index of the subband where the specified PRB is located after the frequency hopping is a fixed value;

the index of the subband where the specified PRB is located after the frequency hopping is: (the index of the subband where the specified PRB is located before the frequency hopping+a constant) mod a number of available subbands in the available subframe set;

the index of the subband where the specified PRB is located after the frequency hopping is: (the index of the subband where the specified PRB is located before the frequency hopping+a frequency hopping factor) mod the number of the available subbands in the available subframe set;

the index of the subband where the specified PRB is located after the frequency hopping is calculated from a preset interleaving function executed on the index of the subband where the specified PRB is located before the frequency hopping; and a sum of the index of the subband where the specified PRB is located and 1 is: [(the index of the subband where the specified PRB is located before the frequency hopping+1)×a constant c] mod a fixed value, where the fixed value is $(N_{sb}+1)$, $N_{sb}$ denotes the number of the available subbands in the available subframe set, and c is relatively prime to $N_{sb}$.

The index of the subband is an index after the subbands in the available subframe set are numbered from 0 according to a preset sequence.

In the frequency hopping pattern, the specified PRB before frequency hopping and the specified PRB after the frequency hopping satisfy one of the followings:

a sum of an index of the specified PRB after the frequency hopping and an index of the specified PRB before the frequency hopping is: (the index of the specified PRB before the frequency hopping mod $N_{RB}^{sb}$)×2+a number of PRBs included in $(N_{sb}-1)$ subbands, where $N_{RB}^{sb}$ denotes the number of PRBs included in a subband and $N_{sb}$ denotes a number of available subbands in the available subframe set;

a sum of the index of the specified PRB after the frequency hopping and the index of the specified PRB before the frequency hopping is a constant;

the index of the specified PRB after the frequency hopping is: (the index of the specified PRB before the frequency hopping+a constant) mod a number of PRBs included in the available subbands in the available subframe set;

the index of the specified PRB after the frequency hopping is: (the index of the specified PRB before the frequency hopping+a frequency hopping factor) mod the number of the PRBs included in the available subbands in the available subframe set;

a difference between the index of the specified PRB after the frequency hopping and the index of the specified PRB before the frequency hopping is: (a first value–a number calculated from a preset interleaving function executed on the first value)×$N_{RB}^{sb}$, where the first value is the index of the specified PRB before the frequency hopping divided by $N_{RB}^{sb}$ and then rounded down;

a difference between the index of the specified PRB after the frequency hopping and the index of the specified PRB before the frequency hopping is: (a second value–a number calculated from the preset interleaving function executed on the second value)×$N_{RB}^{sb}$, where the second value is the index of the specified PRB before the frequency hopping divided by $N_{RB}^{sb}$ and then rounded down; and the index of the specified PRB after the frequency hopping is: (a third value–a fourth value)×$N_{RB}^{sb}$, where the third value is the index of the specified PRB before the frequency hopping divided by $N_{RB}^{sb}$ and then rounded down, the fourth value is: [(the third value+1)×c] mod a fixed value–1, the fixed value is ($N_{sb}$+1), and c is relatively prime to $N_{sb}$.

The index of the PRB is an index after the PRBs in the available subframe set are numbered from 0 according to a preset sequence.

The determination module initializes the frequency hopping factor according to at least one of the following information:

The cell identifier of the cell in which the terminal currently resides;

an information type of the uplink information or the downlink information;

a time domain frequency hopping granularity; and a UE identifier.

In a subframe for sending a PRACH, when a PRB position corresponding to the frequency hopping pattern for sending the uplink data coincides or coincides in part with frequency domain resources of the PRACH, the communication module hops to another available subband and sends the uplink data, or does not send the uplink data in the subframe for sending the PRACH.

In a subframe for sending a system information block (SIB) and/or a physical broadcast channel and/or a paging message and/or downlink control information for scheduling the paging message, when the specified PRB corresponding to the frequency hopping pattern for sending the downlink data coincides or coincides in part with a PRB or a subband where the SIB or PBCH or Paging is located, the communication module hops to another available subband and sends the downlink data, or does not send the downlink data.

The number of repetitions of transmission of the uplink information or the downlink information of the communication module is adjusted according to $N_{rep}$ in a preset or notified mode, where $N_{rep}$ denotes the number of repetitions, and $N_{rep}$ is preset, notified by an eNB or configured by the eNB.

An aggregation level of transmission of the downlink control information of the communication module is adjusted according to C in a preset or notified mode, where C denotes the aggregation level, and C is preset or notified by an eNB or configured by the eNB.

In the TDD system, when sending the uplink data or the uplink control information according to the frequency hopping pattern, the communication module does not receive the downlink control information, or hops to a same narrowband as the uplink data or the uplink control information.

When sending a non-contention PRACH according to the frequency hopping pattern, the communication module does not receive the downlink control information, or hops to a same narrowband as the PRACH and receives the downlink control information.

In an embodiment, a change cycle of a redundancy version (RV) and/or a scrambling sequence of the downlink information or the uplink information of the communication module is Z subframes.

In an embodiment, the determination module is further configured to determine the change cycle Z according to at least one of the following information:

a number of repetitions of the downlink information or the uplink information;

the time domain frequency hopping granularity; and whether frequency hopping exists in the frequency hopping pattern.

In an embodiment, the determination module determines the change cycle Z according to one of the following modes:

Z is equal to R or R/(4k) or R/(4k) rounded down or R/(4k) rounded up, where R is the number of repetitions of the uplink information or the downlink information and k is a positive integer;

Z is 1 or 2 or 4;

Z is equal to 5k or 10k, where k is the positive integer;

Z∈{Y, Y/2, Y/2 rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2}, where Y is the time domain frequency hopping granularity; and a minimum value of any two of preceding modes.

In an embodiment, when no frequency hopping exists in the frequency hopping pattern, the determination module determines the change cycle Z according to one of the following modes:

Z is equal to R or R/(4k) or R/(4k) rounded down or R/(4k) rounded up, where R is the number of repetitions of the uplink information or the downlink information and k is a positive integer;

Z is 1 or 2 or 4;

Z is equal to 5k or 10k, where k is the positive integer; and a minimum value of any two of preceding modes;

when the frequency hopping exists in the frequency hopping pattern, the determination module determines the change cycle Z according to one of the following:

Z is equal to R or R/(4k) or R/(4k) rounded down or R/(4k) rounded up, where R is the number of repetitions of the uplink information or the downlink information and k is a positive integer;

Z is 1 or 2 or 4;

Z is equal to 5k or 10k, where k is the positive integer;

Z∈{Y, Y/2, Y/2 rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2}, where Y is the time domain frequency hopping granularity; and a minimum value of any two of preceding modes.

In an embodiment, the subframes each is a physical subframe or an available subframe.

In an embodiment, the determination module is further configured to determine a transmission gap and/or a transmission cycle.

The communication module sends the uplink information on the specified PRB according to the frequency hopping pattern as follows:

the communication module sends the uplink information on the specified PRB according to the transmission gap and/or the transmission cycle and the frequency hopping pattern.

The communication receives or detects the downlink information on the specified PRB according to the frequency hopping pattern as follows:

the communication receives or detects the downlink information on the specified PRB according to the transmission gap and/or the transmission cycle and the frequency hopping pattern.

In an embodiment, the determination module is further configured to obtain the transmission gap or the transmission cycle through received downlink control information (DCI), radio resource control (RRC) signaling or SIB.

In an embodiment, a subframe corresponding to the transmission gap or the transmission cycle is preset or is determined based on a starting subframe of transmission.

The communication module performs transmission according to one of the following modes:

starting from a starting subframe of transmission, the transmission is stopped in y subframes each time after the transmission is performed in x subframes, until the transmission is completed;

starting from the starting subframe of the transmission, the transmission is stopped in y subframes each time after the transmission is performed in (x-y) subframes, until the transmission is completed; and starting from the starting subframe of the transmission, the transmission is stopped in y subframes each time after the transmission is performed in a subframes, until the transmission is completed, where $$a = \left\lfloor \frac{N}{\lceil N/x \rceil} \right\rfloor \text{ or } \left\lceil \frac{N}{\lceil N/x \rceil} \right\rceil \text{ or } \left\lfloor \frac{N}{\lceil N/(x-y) \rceil} \right\rfloor \text{ or } \left\lceil \frac{N}{\lceil N/(x-y) \rceil} \right\rceil.$$

The transmission cycle is x subframes, the transmission gap is y subframes, N denotes a total number of transmitting subframes, $\lfloor \ \rfloor$ denotes rounding down and $\lceil \ \rceil$ denotes rounding up.

In an embodiment, in the frequency hopping pattern, frequency hopping occurs after transmission is performed in p subframes starting from a first subframe after the transmission gap.

Embodiments of the present disclosure further provide an information transmission apparatus. The apparatus includes:

a second determination module, which is configured to determine a frequency hopping pattern; and a second communication module, which is configured to send downlink information on a specified physical resource block (PRB) according to the frequency hopping pattern, or receive or detect uplink information on the specified PRB according to the frequency hopping pattern.

The frequency hopping pattern is determined according to at least one of the following information:
a time domain frequency hopping granularity;
an available subframe set;
an available subband set;
a time division duplex (TDD) uplink and downlink configuration;
a number of PRBs included in each available subband; and
a cell identifier of a cell in which a terminal currently resides.

Embodiment 1

This embodiment provides an example of a frequency hopping pattern. In this embodiment, a UE sends uplink information or receives/detects downlink information on a specified PRB according to the frequency hopping pattern. The sent uplink information includes at least one of the followings: Physical Random Access Channel (PRACH), Physical Uplink Control Channel (PUCCH), Physical Uplink Share Channel (PUSCH) and Physical Downlink Share Channel (PDSCH). The detected downlink information is Physical Downlink Control Channel (PDCCH)/Enhanced Physical Downlink Control Channel (EPDCCH).

The UE sends the uplink information or receives/detects the downlink information on the specified PRB according to the frequency hopping pattern. The frequency hopping pattern is determined according to at least one of the following information:
an available subframe set;
an available subband set;
a time domain frequency hopping granularity; and
a TDD uplink and downlink configuration.

The available subframe set refers to a set of available subframes applicable to frequency hopping. The available subframe set may be preset. For example, the available subframe set includes all subframes. In an embodiment, the available subframes in the downlink are subframes excluding MBSFN subframes. In an embodiment, the available subframes may be configured by an eNB. For example, the eNB presets/notifies one period for the UE and indicates the available subframes within the cycle by using a bitmap. For example, the period is 20 ms, which means that, starting from subframe 0, the distribution of available subframes within the subframes in each 20 ms is represented using 20 bits. Different channels may have same or different available subframe sets.

The available subband set refers to a set of subbands that can be used for frequency hopping. The available subband set may be preset. For example, a system bandwidth is divided into a plurality of subbands according to a preset mode, and the available subbands are all subbands that have been divided. In an embodiment, the available subband set may also be notified by the eNB through SIB or RRC signaling. For example, each system bandwidth is divided into a plurality of subbands according to the preset mode. Then, the eNB sends a SIB, which includes a bitmap to indicate the available subband set. For example, the system bandwidth includes 8 subbands, whose indexes are 0, 1, 2, 3, 4, 5, 6 and 7 respectively. Thus, "01111011" indicates that the available subband set includes 6 subbands, whose indexes are 1, 2, 3, 4, 6 and 7 respectively.

Figure 1:
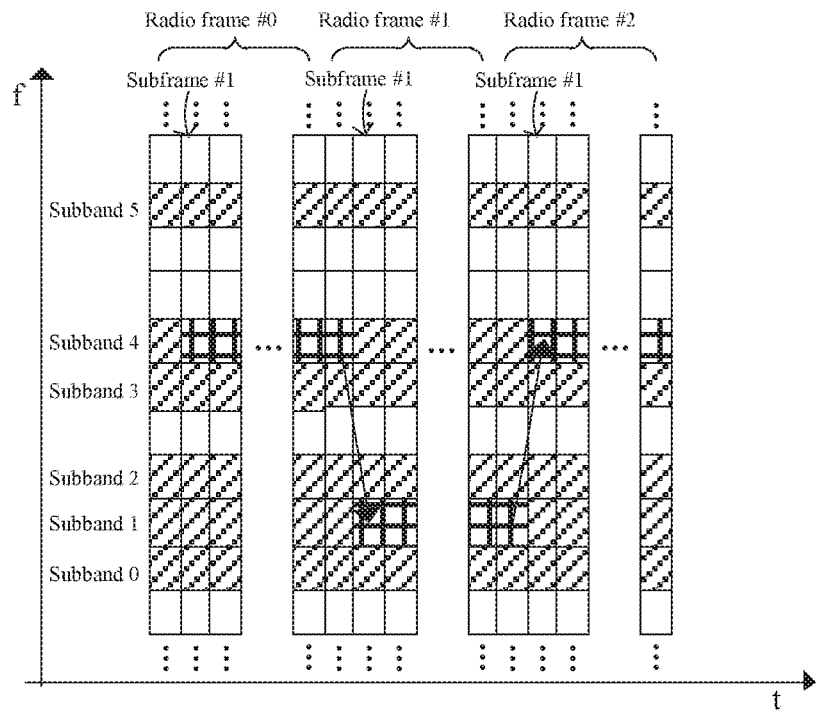
FIG. 1 is a schematic diagram of a frequency hopping pattern according to an embodiment of the present disclosure.

In an embodiment, the eNB notifies one offset value A, so the available subband set includes all or part of multiple subbands, into which the eNB divides PRB#Δ~($N_{RB}$−Δ−1) according to a preset rule. $N_{RB}$ is the number of PRBs included in the system bandwidth. For example, NRB=100 in a system bandwidth of 20 M. For example, PRB#Δ~($N_{RB}$−Δ−1) are divided from both sides to the middle. As shown in FIG. 1 where Δ=2, i.e., every 6 consecutive PRBs are grouped into one subband from either side to the middle.

The number of remaining PRBs in the middle is less than 6, and these PRBs may be grouped into one subband or do not belong to any subband. In a special case, PRB#Δ~($N_{RB}$−Δ−1) are divided into two subbands, i.e., two regions. When $N_{RB}$ is an odd number, the middle PRB is not included in any of the two subbands. Frequency hopping is performed in these two regions. For example, the uplink control information may be transmitted through mirror frequency hopping in the two regions. When the available subband set includes only part of the subbands, the specific subbands included in the available subband set may be preset. For example, the specific subbands are two subbands on both sides or are notified by the eNB. In an embodiment, the number of subbands is notified. For example, 4 subbands are notified, so the specific subbands are 4 subbands from both sides to the center, such as subbands #0, 1, 2 and 3 in FIG. 1. The actual application is not limited to the above division modes.

The eNB may notify a total of one available subband set for all channels or notify one available subband set for each of one or more channels separately. The notification may be in any of the above ways.

The time domain frequency hopping granularity Y in frequency hopping means that the specified PRBs, on which the UE sends the uplink information or receives/detects the downlink information according to the frequency hopping pattern, are located in a same subband in Y consecutive subframes. The Y consecutive subframes may be consecutive physical subframes, that is, physical subframes defined in the related art. For example, in a case of Y=5, transmission is performed in subband #0 in subframes 0 to 4 and in subband #1 in subframes 5 to 9. Here, subframes, which are actually used for transmission (the available subframes in the available subframe set), may be subframes #0 to 9 or part of the subframes #0 to 9. For example, the available subframes are 1, 3, 7, 8 and 9, so transmission is performed in subband #0 in subframes 1 and 3 and in subband #1 in subframes 7, 8 and 9. In an embodiment, the Y consecutive subframes may also be available subframes in Y available subframe sets. For example, in one radio frame, Y=4, and available subframes are 0, 2, 3, 4, 5, 6, 8 and 9, so transmission is performed in subband #0 in subframes 0, 2, 3 and 4, and in subband #1 in subframes 5, 6, 8 and 9.

The time domain frequency hopping granularity may be preset or may be notified by the eNB. For example, it is preset or notified that Y=4.

The time domain frequency hopping granularity may also be preset as the number of repetitions corresponding to the lowest repetition level of an uplink channel or a downlink with the least number of repetitions among uplink channels or downlink channels that use the same frequency hopping pattern, or preset as half the this number of repetitions. For example, assuming that EPDCCH and PDSCH use the same frequency hopping pattern, the number of repetitions of PDSCH is the least, and the number of repetitions corresponding to the lowest repetition level is 10, then Y=10 or 5.

In an embodiment, for one channel, the time domain frequency hopping granularity may also be defined as the number of repetitions corresponding to the lowest repetition level of the channel or half of this number of repetitions.

In an embodiment, for one channel, the time domain frequency hopping granularity may also be defined as the number of repetitions corresponding to the repetition level of the channel or half of this number of repetitions. For example, the repetition level of the PDSCH is 2, and the number of repetitions corresponding to the repetition level is 36, so Y=36 or 18.

The time domain frequency hopping granularity may be determined by a third number of repetitions and the number of subbands for frequency hopping in one repeated transmission. The third number of repetitions is the number of repetitions required for one repeated transmission. For example, assuming that one repeated transmission of the PUSCH occupies 10 subframes and it is required that the frequency hopping in one transmission of the PUSCH is performed between two subbands, then the time domain frequency hopping granularity Y=10/2=5. For another example, assuming that one repeated transmission of the PUSCH occupies 20 subframes and it is required that the frequency hopping in one transmission of the PUSCH is performed among 4 subbands, then the time domain frequency hopping granularity Y=20/4=5.

In an embodiment, to randomize inter-cell interference, the time domain hopping granularity may also be a function of a cell identifier, for example, Y=a+f(cell-ID), where a denotes a preset number or is notified by the eNB, cell-ID denotes the cell identifier, f(cell-ID) denotes the function of the cell identifier (e.g., f(cell-ID)=cell-ID mod 4), and mod denotes modulo operation.

In an embodiment, in an actual frequency hopping pattern, if an unavailable subframe is encountered and the number of subframes sent/received in the same subband before the unavailable subframe does not exceed the time domain frequency hopping granularity, frequency hopping may occurs in the unavailable subframe. For example, if the available subframes are subframes #0, 1, 3, 4, 5, 6, 7, 8 and 9, the time domain frequency hopping granularity is 4, and the starting subframe of the frequency hopping is #0, then transmission is performed in subband #0 in subframes #0 and 1. Since subframe #2 is not available, transmission is performed in subband #1 in subframes #4, 5, 6, and 7 according to the frequency hopping pattern. Finally, transmission hops to subband #2 in subframe #9.

In an embodiment, the frequency hopping pattern is further determined by the number of PRBs included in each available subband and/or the cell identifier. The number of PRBs included in each available subband may be preset or be configured by the eNB. For example, the number of PRBs included in each available subband is 6.

In an embodiment, the time domain frequency hopping granularity is further determined by the TDD uplink and downlink configuration in a TDD system.

For the uplink channel, the time domain frequency hopping granularity is less than or equal to the number of consecutive uplink subframes in the TDD uplink and downlink configuration.

For the downlink channel, the time domain frequency hopping granularity is less than or equal to the number of consecutive downlink subframes in the TDD uplink and downlink configuration. Examples are given hereinafter for illustration. Table 1 illustrates the uplink and downlink configuration in the existing Rel-8 LTE protocol, where the first column lists the indexes of the uplink and downlink configuration.

| Uplink and Downlink Configuration | Uplink/Downlink Switching Period | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

-continued

| Uplink and Downlink Configuration | Uplink/ Downlink Switching Period | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For example, for uplink and downlink configuration #2, the number of consecutive downlink subframes, including special subframes, is 3 at most. Therefore, the downlink time domain frequency hopping granularity Y may be set to 3, or to a number less than 3, for example, 2. When Y=3, the UE transmits information in a same narrowband in subframes #4, 5 and 6, and hops to another subband for transmission in subframe 9 and in subframes 0 and 1 of the next radio frame. In an embodiment, for uplink and downlink configuration #4, the number of consecutive downlink subframes, including special subframes, is 8 at most, then the time domain frequency hopping granularity Y may be set to 8, or to a number less than 8, for example, 4. In 8 consecutive subframes, the UE hops to another subband after the fourth subframe.

In an embodiment, the frequency hopping pattern makes the frequency hopping to take place at the uplink/downlink switching position, so that unnecessary frequency hopping can be avoided. For example, for uplink and downlink configuration #2, including special subframes, the number of consecutive downlink subframes is 3 at most, and the downlink time domain frequency hopping granularity Y is 3. Assuming that the UE receives a downlink signal in the same narrowband in Y consecutive subframes, and frequency hopping occurs in the last subframe of the Y subframes, then the frequency hopping occurs in subframe 6 or subframe 1 (for example, subframe 6 or subframe 1 is occupied, or the first few symbols of subframe 6 or subframe 1 are occupied). Assuming that the UE receives downlink signals in the same narrowband in Y consecutive subframes, and frequency hopping occurs in the first subframe of the Y subframes, then the frequency hopping occurs in subframe 4 or subframe 9 (for example, subframe 4 or subframe 9 is occupied, or the first few symbols of subframe 4 or subframe 9 are occupied).

In an embodiment, in the TDD system, the time domain frequency hopping granularity is an uplink/downlink switching period or an integral multiple of the uplink/downlink switching period. The time domain frequency hopping granularity here refers to physical subframes. For example, for an uplink and downlink configuration with a downlink-to-uplink switching period of 5 ms, the time domain frequency hopping granularity is 5 ms or an integer multiple of 5 ms. For example, transmission is performed in subband #0 in subframes #0, 1, 2, 3 and 4. Here, transmission is performed in subband #0 in both uplink subframes and downlink subframes. For example, transmission is performed on subband #1 in subframes #5, 6, 7, 8 and 9, where transmission is performed in subband #1 in both uplink subframes and downlink subframes. For an uplink and downlink configuration with a downlink-to-uplink switching period of 10 ms, the time domain frequency hopping granularity is 10 ms or an integer multiple of 10 ms.

Embodiment 2

It is assumed that the total number of candidate frequency hopping subbands is $N_{sb}$. The candidate frequency hopping subbands are sequentially numbered 0, 1, 2, ..., $N_{sb}-1$. The number of PRBs included in the subbands is $N_{RB}^{sb}$. The PRBs in all candidate subbands are numbered from zero to obtain virtual PRB indexes 0 to $(N_{sb} \times N_{RB}^{sb}-1)$. It is assumed that the PRB on which a UE currently sends uplink signals/receives downlink signals/detects downlink signals before the latest frequency hopping is $n_{RB}$ located in subband $n_{sb}$. For example, if the virtual PRB index is $n_{RB}=12$ and 13, $N_{RB}^{sb}=6$, then $n_{sb}=3$.

The frequency hopping pattern represented by subband indexes is given below. The subband $\tilde{n}_{sb}(i)$ where the UE sends the uplink information or receives/detects the downlink information may be calculated using the following formula, where $\tilde{n}_{sb}(i)$ denotes subband index.

$$\tilde{n}_{sb}(i) = (n_{sb} + f_{hop}(i)) \bmod N_{sb}$$

$$i = \lfloor t/Y \rfloor$$

$$f_{hop}(i) = \begin{cases} 1 & N_{sb} = 2 \\ \left(f_{hop}(i-1) + \left(\sum_{k=i\cdot 10+1}^{i\cdot 10+9} c(k) \times 2^{k-(i\cdot 10+1)}\right) \bmod(N_{sb}-1) + 1\right) \bmod N_{sb} & N_{sb} > 2 \end{cases}$$

t denotes the number of the subframe. $i=\lfloor t/Y \rfloor$ denotes rounding down. $f_{hop}(i)$ denotes a frequency hopping factor. $f_{hop}(-1)=0$. $f_m(i)$ denotes a mirror factor indicating that resources allocated to the UE hop to another narrowband and then are mirrored within the narrowband. In practical use, $f_m(i)$ may also be set to 0, that is, no mirroring is performed. The pseudo-random sequence c(n) is generated from a 31-bit-long Gold sequence:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

Here Nc=1600 and the first m sequence is $x_1(0)=1$, $x_1(n)=0$, n=1, 2, ..., 30. Initialization is performed. The second m sequence is initialized using a cell identifier. For example, for FDD, $$c_{init} = N_{ID}^{cell} \text{ and } c_{init} = \sum_{i=0}^{30} x_2(i) \cdot 2^i.$$

In an embodiment, $c_{init}$ may also be initialized according an information type. For example, for downlink data, $c_{init}=N_{ID}^{cell}+1$; for SIB, $c_{init}=N_{ID}^{cell}+2$; and for EPDCCH, $c_{init}=N_{ID}^{cell}+3$.

In an embodiment, $c_{init}$ may also be initialized using a time domain frequency hopping granularity. For example, $c_{init}=N_{ID}^{cell}+Y$.

Further, $c_{init}$ may also be initialized using a UE identifier. For example, $c_{init}=N_{ID}^{cell}+\text{C-RNTI} \bmod M$, where M is a constant.

In practical use, $c_{init}$ may be initialized according to one or more of the cell identifier, the information type of the uplink information or the downlink information, the time domain frequency hopping granularity, and the UE identifier.

The frequency hopping pattern represented by virtual PRB indexes is given below.

The resource $\tilde{n}_{RB}(i)$ where the UE sends the uplink information or receives/detects the downlink information may be calculated using the following formula, where $\tilde{n}_{RB}(i)$ denotes a virtual PRB index.

$$\tilde{n}_{RB}(i)=(n_{RB}+f_{hop}(i) \cdot N_{RB}^{sb}+((N_{RB}^{sb}-1)-2(\tilde{n}_{VRB} \bmod N_{RB}^{sb})) \cdot f_m(i)) \bmod (N_{RB}^{sb} \cdot N_{sb})$$

$$i=\lfloor t/Y \rfloor$$

$$f_m(i)=c(i \cdot 10)$$

t denotes a subframe number, t may be a subframe number in the related art, that is, a physical subframe number, that is, $t=10 \times n_f + n_{sf}$, where $n_f$ is a radio frame number, t may be an existing subframe number with a fixed offset, such as $t=10 \times n_f + n_{sf} + C$, where C is an integer. In an embodiment, t may be a valid subframe number. For example, all valid subframes in one period are sequentially numbered from 0 in ascending order. For example, one period is 100 subframes, of which 60 are valid subframes, and these valid subframes are sequentially numbered from 0 to 59. The definition of t mentioned hereinafter is as above.

$f_m(i)$ denotes a mirror factor indicating that resources allocated to the UE hop to another narrowband and then are mirrored within the narrowband.

In an embodiment, the c(n) may also be a preset sequence that is irrelevant to the cell identifier.

In the above frequency hopping formulas and subsequent embodiments, for PDSCH/PUSCH, $n_{RB}$ or $n_{sb}$ may be obtained in a resource allocation domain in downlink authorization/uplink authorization. For example, there are a total of two candidate frequency hopping subbands, actual PRB indexes are 5 to 10 and 20 to 25, and renumbered virtual indexes are 0 to 11. If the actual PRB indexes of the frequency domain resources allocated to the UE in the downlink authorization are 24 and 25, and the corresponding virtual indexes $n_{RB}$ are 10 and 11, then 10 and 11 are substituted into the above formulas to obtain a frequency domain position in each subframe. For EPDCCH, an eNB may also configure resources through RRC signaling, and the same method may be used to obtain the frequency domain position of EPDCCH in each subframe.

In an embodiment, the frequency domain resources allocated to the UE may correspond to a preset subframe. That is, the resources refer to resources of the UE in a certain preset subframe, such as resources in subframe #0 in radio frame #0. That is, for the frequency hopping pattern described above, the frequency domain resources allocated to the UE correspond to subframe #0 in radio frame #0. The UE regards the frequency domain resources allocated to the UE $\tilde{n}_{RB}(i)$. The UE may first substitute nf=0, nsf=0, and $\tilde{n}_{RB}(i)$ into the above frequency hopping formula to deduce $n_{RB}$. Then, for other subframes, the UE substitutes the radio frame, subframe number and $n_{RB}$ of other subframes into the above frequency hopping formula to obtain $\tilde{n}_{RB}(i)$ in other subframes.

In an embodiment, the frequency domain resources allocated to the UE correspond to the preset subframe. For PDSCH/PUSCH, the preset subframe may be a starting subframe in which the UE receives PDSCH or sends PUSCH. Similar to the above, that is, for the above frequency hopping pattern, the preset or eNB-configured resources $\tilde{n}_{RB}(i)$ correspond to the starting subframe in which the UE receives PDSCH or sends PUSCH. The UE may first substitute nf, nsf and $\tilde{n}_{RB}(i)$ corresponding to the starting subframe into the above frequency hopping formula to deduct $n_{RB}$. Then, for other subframes, the UE substitutes the radio frame, subframe number and $n_{RB}$ of other subframes into the above frequency hopping formula to obtain $\tilde{n}_{RB}(i)$ in other subframes.

The frequency hopping formula may also be represented by the frequency domain positions before and after frequency hopping, that is, the frequency domain position after frequency hopping is a function of the frequency domain position before frequency hopping.

$$\tilde{n}_{sb}(i+1)=(\tilde{n}_{sb}(i)+f_{hop}(i)) \bmod N_{sb}, \text{ or}$$

$$\tilde{n}_{RB}(i+1)=(\tilde{n}_{RB}(i)+f_{hop}(i) \cdot N_{RB}^{sb}+((N_{RB}^{sb}-1)-2(\tilde{n}_{VRB} \bmod N_{RB}^{sb})) \cdot f_m(i)) \bmod (N_{RB}^{sb} \cdot N_{sb}).$$

For the above frequency hopping formula and subsequent embodiments in which the frequency hopping pattern is defined by the frequency domain positions before and after frequency hopping, the initial frequency domain position may be preset or be configured by the eNB. For example, for EPDCCH, the eNB-configured subband of EPDCCH may be preset as the subband where the UE detects EPDCCH in the preset subframe, for example, subframe #0 in radio frame #0. The UE detects EPDCCH in the same subband in every Y consecutive subframes, and hops to another subband for receiving in subsequent Y subframes. For PDSCH/PUSCH, the initial frequency domain position may be a PRB allocated in downlink authorization or uplink authorization. The subframe where frequency hopping occurs may be determined based on the initial subframe for transmitting PDSCH/PUSCH. For example, starting from the initial subframe, every Y consecutive subframes are in the same subband, and the UE hops to another subband in subsequent Y subframes. In an embodiment, frequency hopping is performed at a fixed position. For example, in the above formula, it is assumed that $i=\lfloor t/Y \rfloor$. The PRB allocated in downlink authorization or uplink authorization is the frequency domain position in the starting subframe for transmitting PDSCH/PUSCH. The frequency domain position for subsequent transmission is calculated according to $i=\lfloor t/Y \rfloor$ and the frequency hopping formula.

Embodiment 3

This embodiment gives an example of frequency hopping.

The rule of the frequency hopping is mirror frequency hopping in candidate frequency hopping subbands or PRBs, and the number of frequency hopping subbands is 2. It is assumed that a time domain frequency hopping granularity is Y (i.e., mirror frequency hopping is performed between two subbands every Y granularity), and that frequency hopping may be performed for multiple times. It is assumed that the total number of candidate frequency hopping subbands is $N_{sb}$. The candidate frequency hopping subbands are sequentially numbered 0, 1, 2, ..., $N_{sb}-1$. The number of PRBs included in each subband is $N_{RB}^{sb}$. The PRBs in all candidate subbands are numbered from zero to obtain virtual PRB indexes 0 to $(N_{sb} \times N_{RB}-1)$. It is assumed that the PRB on which a UE currently sends uplink signals/receives downlink signals/detects downlink signals before the latest frequency hopping is nRB located in subband $n_{sb}$. For example, if the virtual PRB index is $n_{RB}=12$ and 13, $N_{RB}^{sb}=6$, then $n_{sb}=3$.

The frequency hopping pattern represented by subband indexes is given below. The subband $\tilde{n}_{sb}(i)$ where the UE sends the uplink information or receives/detects the downlink information may be calculated using the following formula, where $\tilde{n}_{sb}(i)$ denotes a subband index.

$$\tilde{n}_{sb}(i) = \begin{cases} n_{sb} & i \bmod 2 = 0 \\ N_{sb} - n_{sb} - 1 & i \bmod 2 = 1 \end{cases}$$

$$i = \lfloor t/Y \rfloor$$

t denotes a subframe number.

Figure 2:
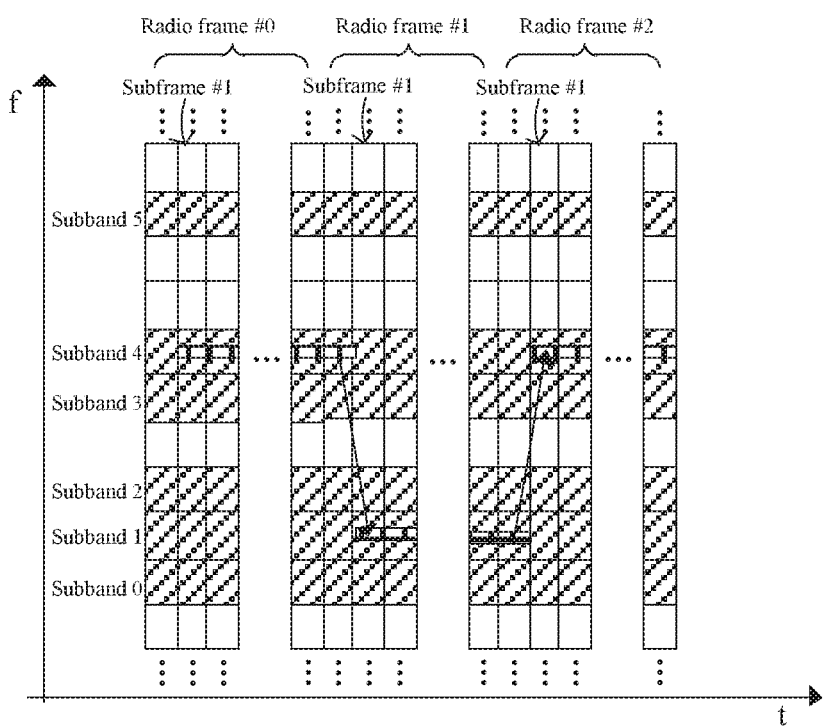
FIG. 2 is a schematic diagram of a frequency hopping pattern according to an embodiment of the present disclosure.

In FIG. 2, the total number of candidate subbands is 6, the time domain granularity Y is 10, and the initially transmitted subframe is subframe #0 on radio frame #0. The index of the subband where resources allocated to the UE are located is $n_{sb}=4$. The mirror subband index is $N_{sb}-n_{sb}-1=1$. Mirror frequency hopping is performed once in the subframe #1 of each radio frame.

The frequency hopping pattern represented by virtual PRB indexes is given below. The resource $\tilde{n}_{RB}(i)$ where the UE sends the uplink information or receives/detects the downlink information may be calculated using the following formula, where $\tilde{n}_{RB}(i)$ denotes a virtual PRB index.

$$\tilde{n}_{RB}(i) = \begin{cases} n_{RB} & i \bmod 2 = 0 \\ N_{sb} \times N_{RB}^{sb} - n_{RB} - 1 & i \bmod 2 = 1 \end{cases}$$

$$i = \lfloor t/Y \rfloor, \text{ or}$$

$$\tilde{n}_{RB}(i) = \begin{cases} n_{RB} & i \bmod 2 = 0 \\ N_{RB}^{sb} \times (N_{sb} - n_{sb} - 1) + n_{RB} \bmod N_{RB}^{sb} & i \bmod 2 = 1 \end{cases}$$

$$i = \lfloor t/Y \rfloor,$$

t denotes a subframe number.

Figure 3:
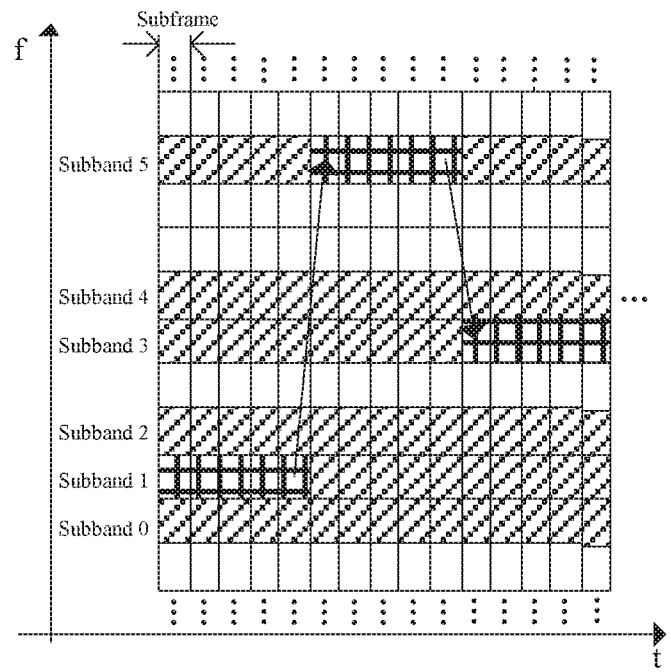
FIG. 3 is a schematic diagram of a frequency hopping pattern according to an embodiment of the present disclosure.

In FIG. 3, the total number of candidate subbands is 6, the time domain granularity Y is 10, and the initially transmitted subframe is subframe #0 on radio frame #0. The index of the subband where resources allocated to the UE are located is $n_{sb}=4$. $N_{RB}^{sb}=6$. $n_{RB}=4 \times 6+3=27$. The mirror PRB index is $N_{sb} \times N_{RB}^{sb} - n_{RB}-1=8$. Mirror frequency hopping is performed once in the subframe #1 of each radio frame.

The frequency hopping formula may also be represented by the frequency domain positions before and after frequency hopping, that is, the frequency domain position after frequency hopping is a function of the frequency domain position before frequency hopping, as followings:

$$\tilde{n}_{sb}(i+1) = N_{sb} - \tilde{n}_{sb}(i) - 1, i = \lfloor t/Y \rfloor$$

$$\tilde{n}_{RB}(i+1) = N_{sb} \times N_{RB}^{sb} - n_{RB} - 1, \text{ or}$$

$$\tilde{n}_{RB}(i+1) = N_{RB}^{sb} \times (N_{sb} - n_{sb} - 1) + \tilde{n}_{RB}(i) \bmod N_{RB}^{sb}.$$

Embodiment 4

This embodiment gives an example of frequency hopping.

The rule of the frequency hopping is to perform fixed offset frequency hopping in candidate frequency hopping subbands or PRBs, and the number of frequency hopping subbands is at least 2. It is assumed that a time domain frequency hopping granularity is Y, that is, fixed offset frequency hopping is performed every Y granularity. It is assumed that the total number of candidate frequency hopping subbands is $N_{sb}$. The candidate frequency hopping subbands are sequentially numbered 0, 1, 2, ..., $N_{sb}-1$. The number of PRBs included in each subband is $N_{RB}^{sb}$. The PRBs in all candidate subbands are numbered from zero to obtain virtual PRB indexes 0 to $(N_{sb} \times N_{RB}^{sb}-1)$. It is assumed that the PRB where a UE currently sends uplink signals/receives downlink signals/detects downlink signals before the latest frequency hopping is $n_{RB}$ located in subband $n_{sb}$. For example, if the virtual PRB index $n_{RB}=12$ and 13, $N_{RB}^{sb}=6$, then $n_{sb}=3$.

The frequency hopping pattern represented by subband indexes is given below. The subband $\tilde{n}_{sb}(i)$ where the UE sends the uplink information or receives/detects the downlink information may be calculated using the following formula, where $\tilde{n}_{sb}(i)$ denotes a subband index.

$$\tilde{n}_{sb}(i) = (n_{sb} + i \cdot N_{sb\_\text{offset}}) \bmod N_{sb}$$

$$i = \lfloor t/Y \rfloor$$

t denotes a subframe number. $N_{sb\_\text{offset}}$ denotes a fixed subframe offset and is a non-zero integer.

Figure 4:
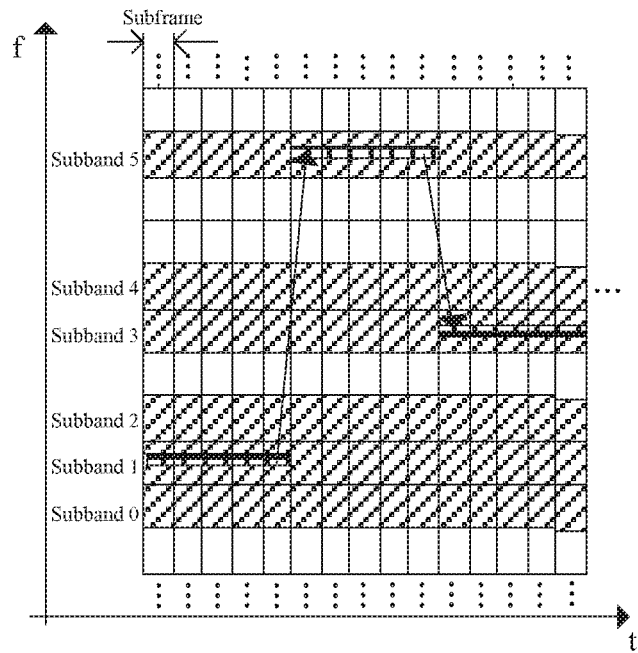
FIG. 4 is a schematic diagram of a frequency hopping pattern according to an embodiment of the present disclosure.

In FIG. 4, the total number of candidate subbands is 6, the time domain granularity Y is 5, and the initially transmitted subframe is subframe #0 of radio frame #0. The index of the subband where resources allocated to the UE are located is $n_{sb}=1$, and the fixed offset $N_{sb\_\text{offset}}=4$, that is, each half radio frame has a fixed offset of 4 subbands. A cyclic offset from subband 0 is performed when the offset exceeds the maximum subband index. Frequency hopping occurs once every 5 subframes. It can be seen that the number of frequency hopping subbands in this figure is 3.

The frequency hopping pattern represented by virtual PRB indexes is given below. The resource $\tilde{n}_{RB}(i)$ where the UE sends the uplink information or receives/detects the downlink information may be calculated using the following formula, where $\tilde{n}_{RB}(i)$ denotes a virtual PRB index.

$$\tilde{n}_{RB}(i) = (n_{RB} + i \cdot N_{sb\_\text{offset}} \times N_{RB}^{sb}) \bmod (N_{sb} \times N_{RB}^{sb})$$

$$i = \lfloor t/Y \rfloor,$$

t denotes a subframe number.

Figure 5:
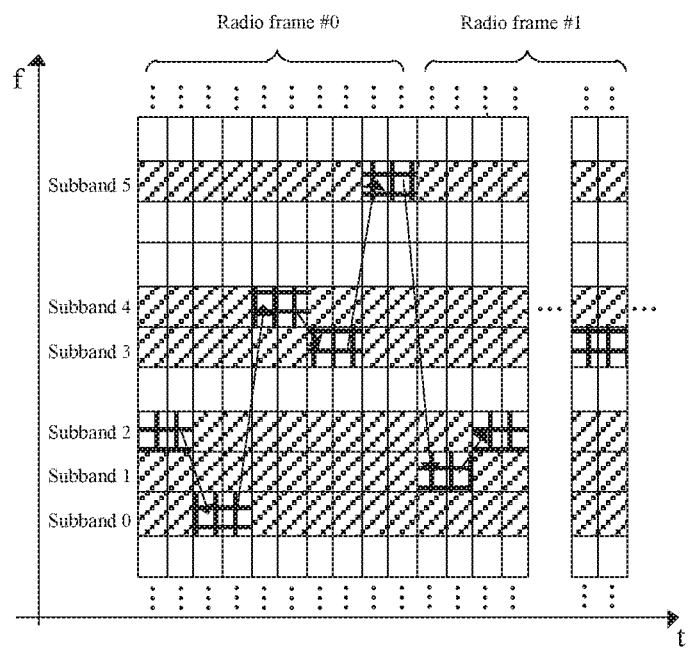
FIG. 5 is a schematic diagram of a frequency hopping pattern according to an embodiment of the present disclosure.

In FIG. 5, the total number of candidate subbands is 6, the time domain granularity Y is 5, and the initially transmitted subframe is subframe #0 of radio frame #0. The index of the subband where resources allocated to the UE are located is $n_{sb}=1$. $N_{RB}^{sb}=6$. $n_{RB}=1 \times 6+4=10$. The fixed offset $N_{sb\_\text{offset}} \times N_{RB}^{sb}=24$, that is, a span of 4 subbands. The PRB index after frequency hopping is $n_{RB}=10+24=34$. Frequency hopping occurs once every 5 subframes.

The frequency hopping formula may also be represented by the frequency domain positions before and after frequency hopping, that is, the frequency domain position after frequency hopping is a function of the frequency domain position before frequency hopping, as followings:

$$\tilde{n}_{sb}(i+1)(\tilde{n}_{sb}(i) + N_{sb\_\text{offset}}) \bmod N_{sb}, \text{ or}$$

$$\tilde{n}_{RB}(i+1) = (\tilde{n}_{RB}(i) + N_{sb\_\text{offset}} \times N_{RB}^{sb}) \bmod (N_{sb} \times N_{RB}^{sb}).$$

Embodiment 5

The rule of the frequency hopping is to perform fixed offset frequency hopping in candidate frequency hopping subbands or PRBs, and the number of frequency hopping subbands is 2. It is assumed that a time domain frequency hopping granularity is Y (fixed offset frequency hopping is performed every Y granularity), and frequency hopping may be performed for multiple times. It is assumed that the total number of candidate frequency hopping subbands is $N_{sb}$. The candidate frequency hopping subbands are sequentially numbered $0, 1, 2, \ldots, N_{sb}-1$. The number of PRBs included in each subband is $N_{RB}^{sb}$. The PRBs in all candidate subbands are numbered from zero to obtain virtual PRB indexes 0 to $(N_{sb} \times N_{RB}^{sb}-1)$. It is assumed that the PRB where a UE currently sends uplink signals/receives downlink signals/detects downlink signals before the latest frequency hopping is $n_{RB}$ located in subband $n_{sb}$. For example, if the virtual PRB index $n_{RB}=12$ and 13, $N_{RB}^{sb}=6$, then $n_{sb}=3$.

The frequency hopping pattern represented by subband indexes is given below. The subband $\tilde{n}_{sb}(i)$ where the UE sends the uplink information or receives/detects the downlink information in subframe nsf of radio frame nf may be calculated using the following formula, where $\tilde{n}_{sb}(i)$ denotes a subband index.

$$\tilde{n}_{sb}(i) = \begin{cases} n_{sb} & i \bmod 2 = 0 \\ (n_{sb} + N_{sb}/2) \bmod N_{sb} & i \bmod 2 = 1 \end{cases}$$

$$i = \lfloor t/Y \rfloor$$

t denotes a subframe number.

For example, the total number of candidate subbands is 6, and the time domain interval of frequency hopping is always 3, that is, subband 0 and subband 3 form a pair for frequency hopping, or subband 1 and subband 4 form a pair for frequency hopping, or subband 2 and subband 5 form a pair for frequency hopping.

The frequency hopping pattern represented by virtual PRB indexes is given below. The resource $\tilde{n}_{RB}(i)$ where the UE sends the uplink information or receives/detects the downlink information may be calculated using the following formula, where $\tilde{n}_{RB}(i)$ denotes a virtual PRB index.

$$\tilde{n}_{RB}(i) = \begin{cases} n_{RB} & i \bmod 2 = 0 \\ (n_{RB} + (N_{sb}/2)N_{RB}^{sb}) \bmod (N_{sb} \times N_{RB}^{sb}) & i \bmod 2 = 1 \end{cases}$$

$$i = \lfloor t/Y \rfloor$$

t denotes a subframe number.

The frequency hopping formula may also be represented by the frequency domain positions before and after frequency hopping, that is, the frequency domain position after frequency hopping is a function of the frequency domain position before frequency hopping, as followings:

$$\tilde{n}_{sb}(i+1) = (\tilde{n}_{sb}(i) + N_{sb}/2) \bmod N_{sb}, \text{ or}$$

$$\tilde{n}_{RB}(i+1) = (\tilde{n}_{RB}(i) + N_{sb} \times N_{RB}^{sb}/2) \bmod (N_{sb} \times N_{RB}^{sb}).$$

Embodiment 6

The rule of the frequency hopping is to perform frequency hopping in candidate frequency hopping subbands or PRBs according to a specific rule, and the number of frequency hopping subbands is at least 2. It is assumed that a time domain frequency hopping granularity is Y. (the frequency hopping is performed according to the specific rule every Y granularity), and frequency hopping may be performed for multiple times. It is assumed that the total number of candidate frequency hopping subbands is $N_{sb}$. The candidate frequency hopping subbands are sequentially numbered $0, 1, 2, \ldots, N_{sb}-1$. The number of PRBs included in each subband is $N_{RB}^{sb}$. The PRBs in all candidate subbands are numbered from zero to obtain virtual PRB indexes 0 to $(N_{sb} \times N_{RB}^{sb}-1)$. It is assumed that the PRB where a UE currently sends uplink signals/receives downlink signals/detects downlink signals before the latest frequency hopping is $n_{RB}$ located in subband $n_{sb}$. For example, if the virtual PRB index $n_{RB}=12$ and 13, $N_{RB}^{sb}=6$, then $n_{sb}=3$.

The frequency hopping pattern represented by subband indexes is given below. The subband $\tilde{n}_{sb}(i)$ where the UE sends the uplink information or receives/detects the downlink information may be calculated using the following formula, where $\tilde{n}_{sb}(i)$ denotes a subband index. The frequency hopping formula is represented by the frequency domain positions before and after frequency hopping, that is, the frequency domain position after frequency hopping is a function of the frequency domain position before frequency hopping, as followings:

$$\tilde{n}_{sb}(i+1) = ((\tilde{n}_{sb}(i)+1) \cdot c) \bmod (N_{sb}+1) - 1$$

c is a positive integer. c and $N_{sb}$ are relatively prime. For example, $N_{sb}=8$, and c may be 1 or 2 or 3 or 7.

In FIG. 5, the total number of candidate subbands is 6, the time domain granularity Y is 2, the coprime factor c is 5, and the initially transmitted subframe is subframe #0 in radio frame #0. The initial virtual index of the resources allocated to the UE is $n_{sb}=1$. When $n_{sb}=1$ is substituted into the formula, it is obtained that a mapping subband is 2. When the current subband index $n_{sb}=2$ is substituted into the formula, it is obtained that the mapping subband after frequency hopping is 0. The rest may be done in the same manner according to the following table.

| Index Before Frequency Hopping | 0 | 1 | 2 | 3 | 4 | 5 |
|---|---|---|---|---|---|---|
| Index After Frequency Hopping | 4 | 2 | 0 | 5 | 3 | 1 |

Figure 6:
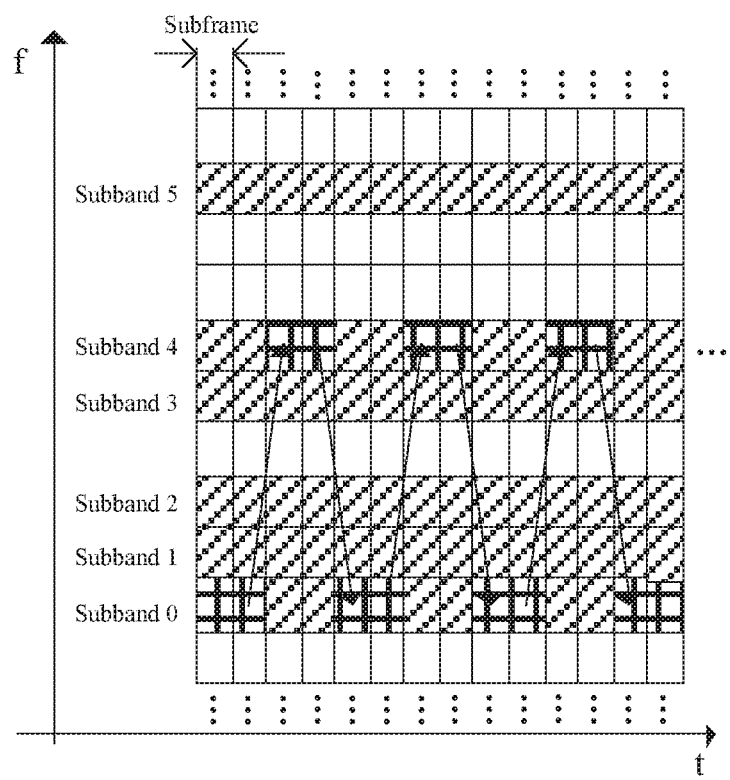
FIG. 6 is a schematic diagram of a frequency hopping pattern according to an embodiment of the present disclosure.
Figure 7:
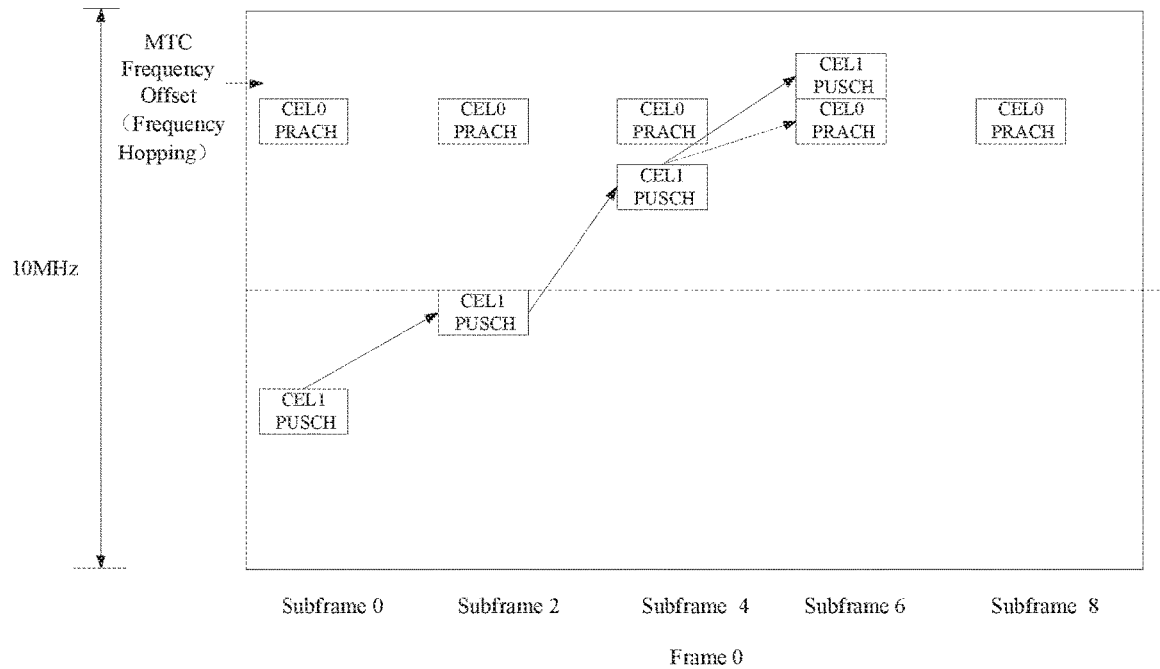
FIG. 7 is a schematic diagram of conflict resolution in frequency hopping according to an embodiment of the present disclosure.

Another example is given below. In FIG. 6, the total number of candidate subbands is 6, the time domain granularity Y is 2, the coprime factor c is 5, and the initially transmitted subframe is subframe #0 in radio frame #0. The initial virtual index of the resources allocated to the UE is $n_{sb}=0$. In subframe #2, the current subband index is substituted into the formula so that it is obtained that the mapping subband is 4. In subframe #4, the mapping subband returns to 0. The rest may be done in the same manner. Frequency hopping is performed back and forth between the two subbands.

The frequency hopping pattern represented by virtual PRB indexes is given below. The resource $\tilde{n}_{RB}(i)$ where the UE sends the uplink information or receives/detects the downlink information may be calculated using the following formula, where $\tilde{n}_{RB}(i)$ denotes a virtual PRB index.

$$\tilde{n}_{RB}(i+1) = ((\tilde{n}_{RB}(i) \bmod N_{sb}^{RB}) + (((\tilde{n}_{sb}(i)+1) \cdot c) \bmod (N_{sb}+1)-1)N_{sb}^{RB}) \bmod N_{sb}^{RB} N_{sb}.$$

Embodiment 7

This embodiment gives an example of a frequency hopping pattern.

It is assumed that the total number of candidate frequency hopping subbands is $N_{sb}$. The candidate frequency hopping subbands are sequentially numbered 0, 1, 2, ..., $N_{sb}-1$. The number of PRBs included in each subband is $N_{RB}^{sb}$. The PRBs in all candidate subbands are numbered from zero to obtain virtual PRB indexes 0 to ($N_{sb} \times N_{RB}^{sb}-1$). It is assumed that the PRB where a UE currently sends uplink signals/receives downlink signals/detects downlink signals before the latest frequency hopping is $n_{RB}$ located in subband $n_{sb}$. For example, if the virtual PRB index $n_{RB}=12$ and 13, $N_{RB}^{sb}=6$, then $n_{sb}=3$.

The frequency hopping pattern represented by subband indexes is given below. The subband position $\tilde{n}_{sb}(i+1)$ at the relationship between the UE sends uplink signals/receives downlink signals/detects downlink signals this time and the subband position $\tilde{n}_{sb}(i)$ before the last frequency hopping is:

$$\tilde{n}_{sb}(i+1)=(g(\tilde{n}_{sb}(i))+C) \bmod N_{sb},$$

C is a constant. $g(\tilde{n}_{sb}(i))$ is an interleaving function. That is, all candidate subbands are written into a matrix row by row, and then are read out column by column. For example, if 8 candidate subbands are written into a 4×4 matrix row by row, the matrix is as follows:

| 0 | 1 | 2 | 3 |
|---|---|---|---|
| 4 | 5 | 6 | 7 |

The candidate subbands are read out column by column as: 0, 4, 1, 5, 2, 6, 3 and 7. Thus, when sb (i)=0, 4, 1, 5, 2, 6, 3, 7, the corresponding $g(\tilde{n}_{sb}(i))$ value is 0, 1, 2, 3, 4, 5, 6, 7, respectively.

The calculation process of $g(\tilde{n}_{sb}(i))$ is given below. The value of $N_{gap}$ is given first.

$$N_{gap} = \begin{cases} \lceil N_{sb}/2 \rceil, & N_{sb} = 6 \sim 10 \\ 4, & N_{sb} = 11 \\ 8, & N_{sb} = 12 \sim 19 \end{cases}.$$

$N'_{sb}=2 \cdot \min(N_{gap}, N_{sb}-N_{gap})$. All subband indexes are interleaved into $N_{row}$ rows and 4 columns. $N_{row}=\lceil N'_{sb}/(4P) \rceil \cdot P$. When $N_{sb} \leq 10$, the value of P is 1; otherwise, the value of P is 2. The subband indexes are written into this matrix row by row, and then are read out column by column. A number $N_{null}$ of null values are inserted in the second and fourth columns of the last $N_{null}/2$ rows. $N_{null}=4N_{row}-N'_{sb}$. When the subband indexes are read out, the null values are ignored.

$$g(\tilde{n}_{sb}(i)) = \begin{cases} \tilde{n}' - N_{row}, & N_{null} \neq 0 \text{ and } n_{sb} \geq N'_{sb} - N_{null} \text{ and } n_{sb} \bmod 2 = 1 \\ \tilde{n}' - N_{row} + N_{null}/2, & N_{null} \neq 0 \text{ and } n_{sb} \geq N'_{sb} - N_{null} \text{ and } n_{sb} \bmod 2 = 0 \\ \tilde{n}'' - N_{null}/2, & N_{null} \neq 0 \text{ and } n_{sb} < N'_{sb} - N_{null} \text{ and } n_{sb} \bmod 4 \geq 2 \\ \tilde{n}'', & \text{otherwise} \end{cases}$$

Here, $n'=2N_{row} \cdot (\tilde{n}_{sb}(i) \bmod 2)+\lfloor \tilde{n}_{sb}(i)/2 \rfloor+N'_{sb} \cdot \lfloor n_{sb}(i)/N'_{sb} \rfloor$, and
$\tilde{n}''=N_{row} \cdot (\tilde{n}_{sb}(i) \bmod 4)+\lfloor \tilde{n}_{sb}(i)/4 \rfloor+N'_{sb} \cdot \lfloor \tilde{n}_{sb}(i)/N'_{sb} \rfloor$.

The frequency hopping pattern represented by virtual PRB indexes is as follows:

$$\tilde{n}_{sb}(i+1)=((g(\tilde{n}_{sb}(i))+C) \bmod N_{sb}) \times N_{RB}^{sb}+n_{RB} \bmod N_{RB}^{sb}.$$

Embodiment 8

This embodiment addresses a conflict in frequency hopping.

In a subframe for sending a PRACH, when a specified PRB corresponding to a frequency hopping pattern for sending uplink data coincides or coincides in part with PRACH resources of the PRACH, the uplink data is caused to hop to another available subband (for example, adjacent available subband) or the uplink data is not sent (that is, the uplink data is stopped from being sent in the subframe where the PRACH is located), as shown in FIG. 8.

A repetition level of a PUSCH is not lower than a repetition level of the PRACH. Here, the higher the repetition level is, the greater the corresponding number of repetitions is. For example, when the repetition level of the PUSCH is 1, the corresponding number of repetitions is 50; when the repetition level of the PUSCH is 0, the corresponding number of repetitions is 10. In this way, when the PUSCH is to hop to a subband configured for the PRACH in a certain subframe, hopping should be performed or sending should be stopped. This processing can prevent the PUSCH from being affected by PRACH signals with better channel conditions.

In an embodiment, the repetition level of the PUSCH is not lower than the repetition level of the PRACH. This processing can ensure normal sending of the PRACH.

A subframe is sent on a system information block (SIB) and/or a physical broadcast channel and/or a paging message and/or downlink control information for scheduling the paging message and, when the specified PRB corresponding to the frequency hopping pattern for sending a downlink data coincides or coincides in part with a PRB or a subband where the SIB or PBCH or Paging is located, the downlink data is caused to hop to and sent on another available subband, or the downlink data is not sent in the subframe, that is, sending is stopped in a subframe where the SIB and/or the physical broadcast channel and/or the paging message and/or the scheduling the paging message is located. For example, SIB1/paging is blindly transmitted on subband #4 in subframe #0. According to the frequency hopping pattern, if a transmission subband of the PDSCH in subframe #0 is subband #4, a UE should not transmit information in this subframe.

Embodiment 9

The frequency hopping pattern of the uplink data and the frequency hopping pattern of the uplink control information have a same frequency domain frequency hopping rule; or the frequency hopping pattern of the uplink data and the frequency hopping pattern of a PRACH have a same frequency domain frequency hopping rule; or the frequency hopping pattern of the uplink control information and the frequency hopping pattern of the PRACH have a same frequency domain frequency hopping rule; or the frequency hopping pattern of the downlink control information and the frequency hopping pattern of the downlink data have a same frequency domain frequency hopping rule.

In an embodiment, the frequency hopping pattern of the downlink control information and the frequency hopping pattern of the downlink data excluding SIB 1 have a same frequency domain frequency hopping rule.

Here, the same frequency domain frequency hopping rule means that the position relationship of subbands or PRBs before frequency hopping and the position relationship of subbands or PRBs after frequency hopping are the same. For example, in the above embodiments 2 to 7, the relationship between the position sb (i+1) of a subband at which the UE sends uplink signals/receives downlink signals/detects downlink signals this time and the position $ñ_{sb}(i)$ of the subband before the latest frequency hopping is calculated using the same formula.

Embodiment 10

Subframes where frequency hopping occurs are determined by a cell identifier. For example, the frequency hopping formula $i=\lfloor t/Y \rfloor$ in the above embodiments may be related to the cell identifier. For example, the expression of i is changed to $i=\lfloor (t+f(cell-ID))/Y \rfloor$, where cell-ID is the cell identifier. f(cell-ID) is a function of the cell identifier, for example, f(cell-ID)=cell-ID mod 10. This can randomize frequency hopping between different cells and avoid interference.

Embodiment 11

If the number of repetitions $N_{rep}$ is preset or semi-statically configured and the enabling of frequency hopping of the UE is dynamically configured through DCI, then the number of repetitions during actual transmission of the UE should be determined based on whether frequency hopping is enabled.

In the case where the number of repetitions $N_{rep}$, which is preset or is semi-statically configured, corresponds to the number of repetitions when there is no frequency hopping, if frequency hopping is not enabled during the actual transmission, then the number of repetitions of the actual transmission is $N_{rep}$; if frequency hopping is enabled during the actual transmission, then frequency hopping brings gains and the number of repetitions of the actual transmission is less than $N_{rep}$, for example, $\alpha N_{rep}$. $\alpha$ is a frequency hopping adjustment factor and has a value less than 1. For example, $\alpha=0.8$. In an embodiment, the actual number of repetitions is $N_{rep}-\alpha'$. Here $\alpha'$ is another method of defining the frequency hopping adjustment factor. The frequency hopping factor may be preset or be configured by an eNB. In practical use, the definition of the frequency hopping adjustment factor, and the relationship between the number of repetitions of the actual transmission and the frequency hopping adjustment factor are not limited to the above, as long as the number of repetitions of the actual transmission is less than $N_{rep}$.

In the case where the number of repetitions $N_{rep}$, which is preset or is semi-statically configured, corresponds to the number of repetitions when there is frequency hopping, if frequency hopping is not enabled during the actual transmission, then the number of repetitions of the actual transmission is greater than $N_{rep}$, for example, $\beta N_{rep}$, where $\beta$ is the frequency hopping adjustment factor and has a preset value greater than 1, for example, $\beta=1.2$; if frequency hopping is enabled during the actual transmission, then the number of repetitions of the actual transmission is $N_{rep}$. In an embodiment, the actual number of repetitions is $N_{rep}+\beta$. Here $\beta'$ is another method of defining the frequency hopping adjustment factor. In practical use, the definition of the frequency hopping adjustment factor, and the relationship between the number of repetitions of the actual transmission and the frequency hopping adjustment factor are not limited to the above, as long as the number of repetitions of the actual transmission is greater than $N_{rep}$. In practical use, this is not limited to the case where $N_{rep}$ is preset or semi-statically configured and where the enabling of frequency hopping of the UE is dynamically configured through DCI; this is also applicable to other configurations. This is applicable to each uplink and downlink channel.

In an embodiment, the frequency hopping adjustment factor may be determined by $N_{rep}$, and different values of $N_{rep}$ may correspond to different frequency hopping adjustment factors.

In an embodiment, for downlink control information, an aggregation level may also be determined by C in a preset mode. C is an aggregation level which is preset or is configured by an eNB. For example, when frequency hopping is not enabled, the aggregation level is still C; after frequency hopping is enabled, the actual aggregation level is reduced to half or downgraded by one level. For example, downgraded from aggregation level 8 to aggregation level 4.

Embodiment 12

In a TDD system, when a UE transmits a PUSCH/PUCCH according to a frequency hopping pattern, the UE may not receive the EPDCCH, or the UE may temporarily hop to a same narrowband as the PUSCH/PUCCH and receive an EPDCCH. For example, for uplink and downlink subframe configuration #1, subframes 0 to 9 are DSUUDD-SUUD respectively, and assuming that the UE sends the PUSCH/PUCCH in narrowband #0 in subframes 2 and 3, then the UE also detects the EPDCCH in narrowband #0 in subframes 4, 5 and 6; assuming that the UE sends the PUSCH/PUCCH in narrowband #1 in subframes 7 and 8, then the UE also detects the EPDCCH in narrowband #1 in subframe 9 and in subframes 0 and 1 of the next radio frame. In an embodiment, assuming that the UE sends the PUSCH/PUCCH in narrowband #0 in subframes 2 and 3, then the UE also detects the EPDCCH in narrowband #0 in subframes 1 and 2 and in subframe 9 of the previous radio frame; assuming that the UE sends the PUSCH/PUCCH in narrowband #1 in subframes 7 and 8, then the UE also detects the EPDCCH in narrowband #1 in subframes 4, 5 and 6.

Similarly, during the transmission of a PRACH, the UE may not receive the EPDCCH or the UE may temporarily hop to a same narrowband as the PRACH and receive the EPDCCH.

Embodiment 13

When there are both UE with enhanced coverage and UE without enhanced coverage, downlink information or uplink information of the UE without enhanced coverage may use a same frequency hopping pattern as the UE with enhanced coverage in the above several embodiments. Here, the UE without enhanced coverage does not need to transmit information repeatedly. In other words, only one subframe is occupied during one transmission. For example, the downlink information of the UE without enhanced coverage may be transmitted using a same frequency hopping pattern as downlink information of the UE with enhanced coverage in a cell.

Embodiment 14

A frequency hopping pattern includes a special frequency hopping pattern, that is, there is no frequency hopping. In other words, uplink information or downlink information is transmitted in the same narrowband during one transmission. Other hopping patterns can all be referred to as hopping patterns with frequency hopping. For example, for a PUSCH, if an eNB schedules a PUSCH such that the PUSCH is transmitted in narrowband #1, and the number of repetitions R is 20, then within the 20 subframes in which the PUSCH is transmitted, the PUSCH is always transmitted in narrowband #1. At this time, a time domain frequency hopping granularity may be considered as meaningless or infinite.

Embodiment 15

During one transmission of uplink information or downlink information, a redundancy version (RV) and/or a scrambling sequence of the information changes once every Z subframes (a change cycle of the redundancy version (RV) and/or the scrambling sequence of the information is Z subframes). This embodiment gives a method of determining the value of Z. When the downlink information is control information, the scrambling sequence scrambles downlink control information of one or more users; when the downlink information and the uplink information are service information, the scrambling sequence scrambles one codeword block of a single user.

Z is determined by the number of repetitions. Z is equal to R or R/4 or floor(R/4) or ceil(R/4), where R denotes the number of repetitions of the information, floor( ) denotes rounding down, and ceil( ) denotes rounding up. In an embodiment, Z is equal to R/(4k) or floor(R/(4k)) or ceil(R/(4k)), where k is a positive integer. This is applicable to both a frequency hopping pattern without frequency hopping and a frequency hopping pattern with frequency hopping.

In an embodiment, Z is a fixed number and Z∈{1, 2, 4}. This is applicable to both a frequency hopping pattern without frequency hopping and a frequency hopping pattern with frequency hopping.

In an embodiment, Z is equal to 5k or 10k, where k is a positive integer greater than 0. This is applicable to both a frequency hopping pattern without frequency hopping and a frequency hopping pattern with frequency hopping.

In an embodiment, Z may also be determined by a time domain frequency hopping granularity Y. For example, Z is one of the followings: min(4, Y), Y, Y/4, floor(Y/4), ceil(Y/4), Y/2, floor(Y/2), ceil(Y/2), max(Y/4,2), max(floor(Y/4), 2), max(ceil(Y/4), 2), max(Y/2, 2), max(floor(Y/2), 2) or max(ceil(Y/2), 2). This is applicable to a frequency hopping pattern with frequency hopping.

In an embodiment, Z may be determined by a combination of the above modes. For example, Z is a minimum of values calculated by any two of the above modes. For example, Z=min(R/4, min(4, Y)), Z=min(R/4, 2) or Z=min(R/4, Y). The Y-related modes can be used for only a frequency hopping pattern with frequency hopping. The Y-irrelevant modes can be used for all scenarios.

In addition, Z may also be determined by whether a frequency hopping pattern has frequency hopping. For example, when the frequency hopping pattern does not have frequency hopping, Z=R/4; when the frequency hopping pattern has frequency hopping, Z=min(4, Y).

The change of RV every Z subframes may take place according to a preset rule, for example, in the order of 0, 2, 3, 1.

The above Z subframes may be physical subframes or available subframes.

Embodiment 16

This embodiment gives an information transmission method.

The method proposed in this embodiment may be used for both a Machine Type Communication (MTC) technology and a NarrowBand-Internet of Things (NB-IoT) system, and the method is not limited to these two scenarios.

In this embodiment, a UE or an eNB needs to repeat frequency hopping in transmission for a long time. For example, the UE transmits one uplink data packet in 2048 subframes. For a full-duplex UE, when the UE transmits uplink information, the UE cannot receive downlink information. If the uplink transmission takes too much time, the UE may lose time and frequency synchronization. Therefore, in one repeated transmission of the UE, some transmission gaps should be set. Within these transmission gaps, the UE stops sending information, receives downlink information, and performs time synchronization. The method described in this embodiment may be used for both uplink and downlink. The method is not limited to a half-duplex UE, and may also be used for a full-duplex UE. The following uses uplink as an example to describe the details.

A transmission gap and a transmission cycle are determined. Uplink information is sent on a specified physical resource block (PRB) according to the transmission gap, the transmission cycle and a frequency hopping pattern, or downlink information is received or detected on the specified PRB according to the frequency hopping pattern.

Here, the transmission cycle may include the transmission gap. For example, the transmission cycle is 512 ms and the transmission gap may be the last 60 ms of the transmission cycle. That is, the UE transmits information for 452 ms, stops transmission for 60 ms, transmits information for 452 ms again, and then stops transmission for 60 ms, until the transmission is completed. In an embodiment, the transmission cycle may not include the transmission gap. For example, the transmission cycle is 512 ms and the transmission gap is 60 ms. That is, the UE transmits information for 512 ms, stops transmission for 60 ms, transmits information for 512 ms again, and then stops transmission for 60 ms, until the transmission is completed.

The transmission gap or the transmission cycle is preset or is configured by the eNB. For example, the transmission gap or the transmission cycle is notified through DCI or RRC signaling or SIB.

A subframe corresponding to the transmission gap or the transmission cycle is preset or is determined by a starting subframe sent by the UE.

When the subframe corresponding to the transmission gap or the transmission cycle is preset, for example, starting from subframe #0 of radio frame #0, the transmission cycle is 512 ms and the transmission gap is 60 ms, if the starting subframe sent by the UE is subframe #0 of radio frame #50, then the UE transmits information in 512 subframes, stops transmission for 60 ms, transmits information in 512 subframes again, and then stops transmission for 60 ms, until the information is completely transmitted. In an embodiment, the subframe corresponding to the transmission gap or the transmission cycle is the starting subframe sent by the UE, for example, starting from the starting subframe sent by the UE, the UE transmits information in 512 subframes, stops transmission for 60 ms, transmits information in 512 subframes again, and then stops transmission for 60 ms, until the transmission is completed.

In an embodiment, starting from the starting subframe of the transmission, the transmission is stopped in y subframes each time after the transmission is performed in x subframes, until the transmission is completed. The transmission cycle is x subframes and the transmission gap is y subframes.

In an embodiment, starting from the starting subframe of the transmission, the transmission is stopped in y subframes each time after the transmission is performed in (x-y) subframes, until the transmission is completed. The transmission cycle is x subframes and the transmission gap is y subframes.

In an embodiment, starting from the starting subframe of the transmission, the transmission is stopped in y subframes each time after the transmission is performed in a subframes, until the transmission is completed.

$$a = \left\lfloor \frac{N}{\lceil N/x \rceil} \right\rfloor \text{ or } \left\lceil \frac{N}{\lceil N/x \rceil} \right\rceil \text{ or } \left\lfloor \frac{N}{\lceil N/(x-y) \rceil} \right\rfloor \text{ or } \left\lceil \frac{N}{\lceil N/(x-y) \rceil} \right\rceil,$$

where the transmission cycle is x subframes, the transmission gap is y subframes, and N denotes the total number of transmitting subframes. For example, assuming that N=512, x=200 and y=60, then $$a = \left\lfloor \frac{N}{\lceil N/x \rceil} \right\rfloor = 170.$$

The number of subframes corresponding to the transmission gap or the transmission cycle is one of the followings:
an integer power of 2;
a multiple of 2 or 4 or 8 or 16;
an integral multiple of a maximum time domain frequency hopping granularity (for example, if a time domain frequency hopping granularity is one of 2 or 4 or 8 or 16, and a maximum time domain frequency hopping granularity is 16, then the transmission gap or the transmission cycle is an integral multiple of 16);
an integral multiple of 60; and
an integral multiple of 100.

The following describes a method for determining a transmission narrowband in the first subframe after the transmission gap.

Figure 10:
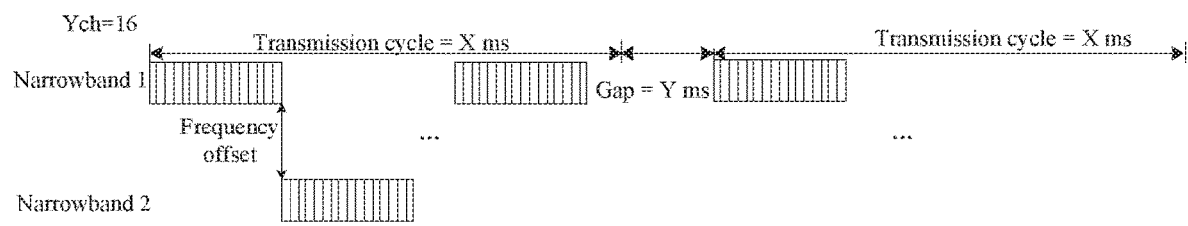
FIG. 10 is a schematic diagram of a frequency hopping pattern according to an embodiment of the present disclosure.

In the first subframe after the transmission gap, a narrowband corresponding to the specified PRB may be the same as a narrowband corresponding to the last subframe before the transmission gap. As shown in FIG. 10, a time domain frequency hopping granularity is Ych=16, and the UE performs transmission with frequency hopping between two narrowbands, where a frequency hopping sequence is: narrowband 1, narrowband 2, narrowband 1, narrowband 2 . . . . There is a frequency offset between the two narrowbands. A narrowband in the first subframe after the transmission gap is the same as a narrowband in the last subframe before the transmission gap. Here, the subframe may be a physical subframe or an available subframe. This definition is also applicable to other parts of this embodiment.

Figure 11:
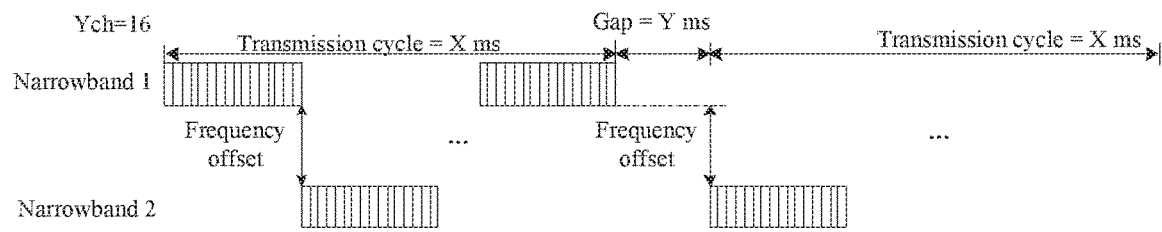
FIG. 11 is a schematic diagram of a frequency hopping pattern according to an embodiment of the present disclosure.

In an embodiment, in the first subframe after the transmission gap, a narrowband corresponding to the specified PRB is the next frequency hopping narrowband corresponding to the narrowband corresponding to the last subframe before the transmission gap. As shown in FIG. 11, a time domain frequency hopping granularity is Ych=16, and the UE performs transmission with frequency hopping between two narrowbands, where a frequency hopping sequence is: narrowband 1, narrowband 2, narrowband 1, narrowband 2 . . . . There is a frequency offset between the two narrowbands. There is a frequency offset between the two narrowbands. A narrowband corresponding to the last subframe before the transmission gap is narrowband 1, so a narrowband corresponding to the first subframe after the transmission gap is narrowband 2.

Figure 12:
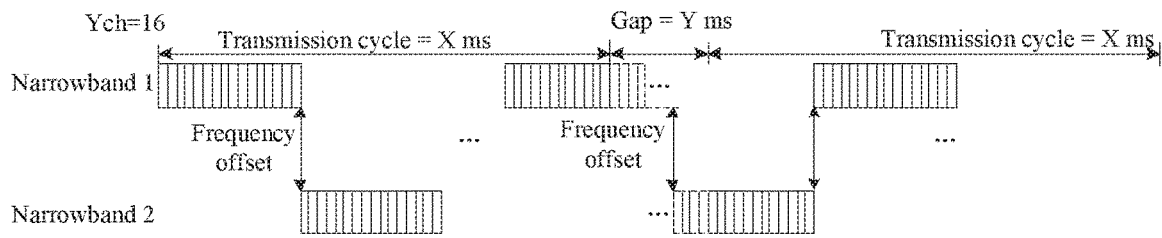
FIG. 12 is a schematic diagram of a frequency hopping pattern according to an embodiment of the present disclosure.

In an embodiment, in the first subframe after the transmission gap, a narrowband corresponding to the specified PRB is a frequency hopping narrowband obtained according to the frequency hopping pattern by using subframes within the transmission gap as transmission time. As shown in FIG. 12, a time domain frequency hopping granularity is Ych=16, and the UE performs transmission with frequency hopping between two narrowbands, where a frequency hopping sequence is: narrowband 1, narrowband 2, narrowband 1, narrowband 2 . . . . There is a frequency offset between the two narrowbands. The frequency hopping narrowband obtained according to the frequency hopping pattern by using the transmission gap as the transmission time is 2.

The following describes a method for determining the first frequency hopping after the transmission gap.

The first frequency hopping after the transmission gap is the first frequency hopping obtained according to the frequency hopping pattern by using subframes in the transmission gap as the transmission time, as shown in FIG. 12.

In an embodiment, the first frequency hopping after the transmission gap is frequency hopping performed after Ych subframes are sent after the transmission gap. For example, if Ych=16, then frequency hopping is performed after 16 subframes are sent after the transmission gap.

The method for determining the first frequency hopping after the transmission gap and the method for determining a transmission narrowband in the first subframe after the transmission gap may be combined with each other.

Although the embodiments disclosed by the present disclosure are as described above, the content thereof is merely embodiments for facilitating the understanding of the present disclosure and is not intended to limit the present disclosure. Any person skilled in the art to which the present disclosure pertains can make any modifications and changes in the forms and details of the implementation without departing from the present disclosure, but the scope of protection defined by the present disclosure is still subject to the scope defined by the appended claims.

INDUSTRIAL APPLICABILITY

As described above, the information transmission method and apparatus provided by the above embodiments and preferred embodiments, which send uplink information on a specified digital mapping technique PRB according to a determined pattern, or receive or detect downlink information on the specified PRB according to the pattern, can be used for frequency hopping on a repeated channel.

What is claimed is:
1. An information transmission method, comprising:
determining a frequency hopping pattern; and
sending uplink information on a specified physical resource block (PRB) according to the frequency hopping pattern, or receiving or detecting downlink information on the specified PRB according to the frequency hopping pattern,
wherein the frequency hopping pattern is determined according to at least one of the following:
a time domain frequency hopping granularity; an available subframe set; an available subband set;
a time division duplex (TDD) uplink and downlink configuration; a number of PRBs comprised in each available subband; or a cell identifier of a cell in which a terminal currently resides, wherein in a TDD system, the time domain frequency hopping granularity is an uplink/downlink switching period or an integral multiple of the uplink/downlink switching period; wherein the time domain frequency hopping granularity is determined according to at least one of the following:
a number of repetitions corresponding to a lowest repetition level of the uplink information or the downlink information;
a number of repetitions corresponding to a repetition level of the uplink information or the downlink information;
a number of repetitions corresponding to a lowest repetition level of an uplink channel or a downlink channel with a smallest number of repetitions among an uplink channel or a downlink channel that uses a same frequency hopping pattern;
a number of repetitions of one repeated transmission and a number of frequency hopping subbands of the one repeated transmission;
the cell identifier of the cell in which the terminal currently resides; or
the TDD uplink and downlink configuration in the TDD system.

2. The method of claim 1, wherein the available subband set is obtained according to received offset information and/or bitmap information of available subbands sent by an eNB,
wherein in response to determining that the available subband set is obtained according to the offset information, the method comprises: determining the available subband set according to the offset information and a number of the available subbands comprised in the available subband set sent by the eNB.

3. The method of claim 1, wherein in response to determining that the time domain frequency hopping granularity is determined according to the TDD uplink and downlink configuration in the TDD system:
for the uplink channel, the time domain frequency hopping granularity is less than or equal to a number of consecutive uplink subframes in the TDD uplink and downlink configuration, or equal to an integral multiple of the number of the consecutive uplink subframes; and
for the downlink channel, the time domain frequency hopping granularity is less than or equal to a number of consecutive downlink subframes in the TDD uplink and downlink configuration, or equal to an integral multiple of the number of the consecutive downlink subframes.

4. The method of claim 1, wherein the uplink information comprises at least one of the followings: uplink data, uplink control information, or physical random access channel (PRACH) information;
the downlink information comprises downlink control information and/or downlink data.

5. The method of claim 4, wherein in the step of sending the uplink information on the specified PRB according to the frequency hopping pattern, or receiving or detecting the downlink information on the specified PRB according to the frequency hopping pattern:
the frequency hopping pattern of the uplink data and the frequency hopping pattern of the uplink control information include a same frequency domain frequency hopping rule, or
the frequency hopping pattern of the uplink data and the frequency hopping pattern of a PRACH include a same frequency domain frequency hopping rule, or the frequency hopping pattern of the uplink control information and the frequency hopping pattern of the PRACH include a same frequency domain frequency hopping rule, or
the frequency hopping pattern of the downlink control information and the frequency hopping pattern of the downlink data include a same frequency domain frequency hopping rule, or
the frequency hopping pattern of the downlink control information and the frequency hopping pattern of the downlink data excluding one or more system information blocks (SIBs) include a same frequency domain frequency hopping rule; and
in the TDD system, the frequency hopping pattern for sending the downlink information and the frequency hopping pattern for sending the uplink information are the same.

6. The method of claim 4, wherein in a subframe for sending a PRACH, in response to determining that a PRB position corresponding to the frequency hopping pattern for sending the uplink data coincides or coincides in part with frequency domain resources of the PRACH, the uplink data is caused to hop to and sent on another available subband or the uplink data is not sent in the subframe for sending the PRACH.

7. The method of claim 4, wherein in the TDD system, in response to determining that the uplink data or the uplink control information is sent according to the frequency hopping pattern, the downlink control information is not received, or the downlink control information is caused to hop to and received in a same narrowband as the uplink data or the uplink control information.

8. The method of claim 4, wherein in response to determining that a PRACH is sent according to the frequency hopping pattern, the downlink control information is not received, or the downlink control information is caused to hop to and received in a same narrowband as the PRACH.

9. The method of claim 1, wherein frequency hopping occurs in the frequency hopping pattern in at least one of the following subframes:
in the TDD system, in the frequency hopping pattern, the frequency hopping occurs in an uplink/downlink switching subframe;
in the frequency hopping pattern, the frequency hopping occurs in a subframe determined by the cell identifier of the cell in which the terminal currently resides; or
in the frequency hopping pattern, the frequency hopping occurs in a subframe outside the available subband set.

10. The method of claim 1, wherein in the frequency hopping pattern, a subband where the specified PRB is located before frequency hopping and a subband where the specified PRB is located after the frequency hopping satisfy at least one of the following:
a sum of an index of the subband where the specified PRB is located before the frequency hopping and an index of the subband where the specified PRB is located after the frequency hopping is a fixed value;
the index of the subband where the specified PRB is located after the frequency hopping is: (the index of the subband where the specified PRB is located before the frequency hopping+a constant) mod a number of available subbands in the available subframe set;
the index of the subband where the specified PRB is located after the frequency hopping is: (the index of the subband where the specified PRB is located before the frequency hopping+a frequency hopping factor) mod the number of the available subbands in the available subframe set;

the index of the subband where the specified PRB is located after the frequency hopping is calculated from a preset interleaving function executed on the index of the subband where the specified PRB is located before the frequency hopping; or a sum of the index of the subband where the specified PRB is located and 1 is: [(the index of the subband where the specified PRB is located before the frequency hopping+1)×a constant c] mod a fixed value, wherein the fixed value is ($N_{sb}$+1), $N_{sb}$ denotes the number of the available subbands in the available subframe set, and c is relatively prime to $N_{sb}$, wherein the index of the subband is an index after the subbands in the available subframe set are numbered from 0 according to a preset sequence.

11. The method of claim 1, wherein in the frequency hopping pattern, the specified PRB before frequency hopping and the specified PRB after the frequency hopping satisfy at least one of the following:

a sum of an index of the specified PRB after the frequency hopping and an index of the specified PRB before the frequency hopping is: (an index of the specified PRB before the frequency hopping mod $N_{RB}^{sb}$)×2+a number of PRBs comprised in ($N_{sb}$−1) subbands, wherein $N_{RB}^{sb}$ denotes the number of PRBs comprised in a subband and $N_{sb}$ denotes a number of available subbands in the available subframe set;

a sum of the index of the specified PRB after the frequency hopping and the index of the specified PRB before the frequency hopping is a constant;

the index of the specified PRB after the frequency hopping is: (the index of the specified PRB before the frequency hopping+a constant) mod a number of PRBs comprised in the available subbands in the available subframe set;

the index of the specified PRB after the frequency hopping is: (the index of the specified PRB before the frequency hopping+a frequency hopping factor) mod the number of the PRBs comprised in the available subbands in the available subframe set;

a difference between the index of the specified PRB after the frequency hopping and the index of the specified PRB before the frequency hopping is: (a first value−a number calculated from a preset interleaving function executed on the first value)×$N_{RB}^{sb}$ wherein the first value is the index of the specified PRB before the frequency hopping divided by $N_{RB}^{sb}$ and then rounded down;

a difference between the index of the specified PRB after the frequency hopping and the index of the specified PRB before the frequency hopping is: (a second value−a number calculated from the preset interleaving function executed on the second value)×$N_{RB}^{sb}$, wherein the second value is the index of the specified PRB before the frequency hopping divided by $N_{RB}^{sb}$ and then rounded down; or the index of the specified PRB after the frequency hopping is: (a third value−a fourth value)×$N_{RB}^{sb}$, wherein the third value is the index of the specified PRB before the frequency hopping divided by $N_{RB}^{sb}$ and then rounded down, the fourth value is: [(the third value+1)×c] mod a fixed value−1, the fixed value is ($N_{sb}$+1), and c is relatively prime to $N_{sb}$, wherein the index of the PRB is an index after the PRBs in the available subframe set are numbered from 0 according to a preset sequence.

12. The method of claim 1, wherein a change cycle of a redundancy version (RV) and/or a scrambling sequence of the downlink information or the uplink information is Z subframes.

13. The method of claim 12, wherein the change cycle Z is determined according to at least one of the following:
a number of repetitions of the downlink information or the uplink information;
the time domain frequency hopping granularity; or
whether frequency hopping exists in the frequency hopping pattern.

14. The method of claim 12, wherein the change cycle Z is determined according to at least one of the following modes:
mode 1: Z is equal to R or R/(4k) or R/(4k) rounded down or R/(4k) rounded up, wherein R is the number of repetitions of the uplink information or the downlink information and k is a positive integer;
mode 2: Z is 1 or 2 or 4;
mode 3: Z is equal to 5k or 10k, wherein k is the positive integer;
mode 4: Z∈{Y, Y/2, Y/2 rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2}, wherein Y is the time domain frequency hopping granularity; or
a minimum value of any two of modes 1, 2, 3 and 4.

15. The method of claim 12, wherein in response to determining that no frequency hopping exists in the frequency hopping pattern, the change cycle Z is determined according to at least one of the following modes:
mode 1: Z is equal to R or R/(4k) or R/(4k) rounded down or R/(4k) rounded up, wherein R is the number of repetitions of the uplink information or the downlink information and k is a positive integer;
mode 2: Z is 1 or 2 or 4;
mode 3: Z is equal to 5k or 10k, wherein k is the positive integer; or
a minimum value of any two of modes 1, 2 and 3;
in response to determining that the frequency hopping exists in the frequency hopping pattern, the change cycle Z is determined according to at least one of the following modes:
mode 1: Z is equal to R or R/(4k) or R/(4k) rounded down or R/(4k) rounded up, wherein R is the number of repetitions of the uplink information or the downlink information and k is a positive integer;
mode 2: Z is 1 or 2 or 4;
mode 3: Z is equal to 5k or 10k, wherein k is the positive integer;
mode 4: Z∈{Y, Y/2, Y/2 rounded down, Y/2 rounded up, Y/4, Y/4 rounded down, Y/4 rounded up, a maximum value of Y/2 and 2, a maximum value of Y/2 rounded down and 2, a maximum value of Y/2 rounded up and 2, a maximum value of Y/4 and 2, a maximum value of Y/4 rounded down and 2, a maximum value of Y/4 rounded up and 2}, wherein Y is the time domain frequency hopping granularity; or
a minimum value of any two of modes 1, 2, 3 and 4.

16. The method of claim 1, further comprising: determining a transmission gap and/or a transmission cycle, wherein in the frequency hopping pattern, frequency hopping occurs after transmission is performed in p subframes starting from a first subframe after the transmission gap.

17. The method of claim 16, wherein a subframe corresponding to the transmission gap or the transmission cycle is preset or is determined based on a starting subframe of transmission.

18. The method of claim 16, wherein transmission is performed according to at least one of the following modes:
starting from a starting subframe of transmission, the transmission is stopped in y subframes each time after the transmission is performed in x subframes, until the transmission is completed;
starting from the starting subframe of the transmission, the transmission is stopped in y subframes each time after the transmission is performed in (x-y) subframes, until the transmission is completed; or
starting from the starting subframe of the transmission, the transmission is stopped in y subframes each time after the transmission is performed in a subframes, until the transmission is completed, wherein $$a = \left\lfloor \frac{N}{\lceil N/x \rceil} \right\rfloor \text{ or } \left\lceil \frac{N}{\lceil N/x \rceil} \right\rceil \text{ or } \left\lfloor \frac{N}{\lceil N/(x-y) \rceil} \right\rfloor \text{ or } \left\lceil \frac{N}{\lceil N/(x-y) \rceil} \right\rceil,$$

wherein the transmission cycle is x subframes, the transmission gap is y subframes, N denotes a total number of transmitting subframes, $\lfloor \ \rfloor$ denotes rounding down and $\lceil \ \rceil$ denotes rounding up.

19. The method of claim 16, wherein in a first subframe after the transmission gap, a narrowband corresponding to the specified PRB is at least one of the followings:
the narrowband corresponding to the specified PRB is the same as a narrowband corresponding to a last subframe before the transmission gap;
the narrowband corresponding to the specified PRB is a next frequency hopping narrowband corresponding to the narrowband corresponding to the last subframe before the transmission gap;
the narrowband corresponding to the specified PRB is a frequency hopping narrowband obtained according to the frequency hopping pattern, with subframes in the transmission gap regarded as transmission time; or
the narrowband corresponding to the specified PRB is indicated by an eNB.

20. An information transmission method, comprising:
determining a frequency hopping pattern; and
sending downlink information on a specified physical resource block (PRB) according to the frequency hopping pattern, or receiving or detecting uplink information on the specified PRB according to the frequency hopping pattern,
wherein the frequency hopping pattern is determined according to at least one of the following:
a time domain frequency hopping granularity; an available subframe set; an available subband set;
a time division duplex (TDD) uplink and downlink configuration; a number of PRBs comprised in each available subband; or a cell identifier of a cell in which a terminal currently resides, wherein in a TDD system, the time domain frequency hopping granularity is an uplink/downlink switching period or an integral multiple of the uplink/downlink switching period; wherein the time domain frequency hopping granularity is determined according to at least one of the following:
a number of repetitions corresponding to a lowest repetition level of the uplink information or the downlink information;
a number of repetitions corresponding to a repetition level of the uplink information or the downlink information;
a number of repetitions corresponding to a lowest repetition level of an uplink channel or a downlink channel with a smallest number of repetitions among an uplink channel or a downlink channel that uses a same frequency hopping pattern;
a number of repetitions of one repeated transmission and a number of frequency hopping subbands of the one repeated transmission;
the cell identifier of the cell in which the terminal currently resides; or
the TDD uplink and downlink configuration in the TDD system.

21. An information transmission apparatus, comprising:
a determiner configured to determine a frequency hopping pattern; and a communicator configured to send uplink information on a specified physical resource block (PRB) according to the frequency hopping pattern, or receive or detect downlink information on the specified PRB according to the frequency hopping pattern, wherein the determiner is further configured to determine the frequency hopping pattern according to at least one of the following:
a time domain frequency hopping granularity; an available subframe set; an available subband set;
a time division duplex (TDD) uplink and downlink configuration; a number of PRBs comprised in each available subband; or a cell identifier of a cell in which a terminal currently resides, wherein in a TDD system, the time domain frequency hopping granularity is an uplink/downlink switching period or an integral multiple of the uplink/downlink switching period; wherein the determiner is further configured to determine the time domain frequency hopping granularity according to at least one of the following:
a number of repetitions corresponding to a lowest repetition level of the uplink information or the downlink information;
a number of repetitions corresponding to a repetition level of the uplink information or the downlink information;
a number of repetitions corresponding to a lowest repetition level of an uplink channel or a downlink channel with a smallest number of repetitions among an uplink channel or a downlink channel that uses a same frequency hopping pattern;
a number of repetitions of one repeated transmission and a number of frequency hopping subbands of the one repeated transmission;
the cell identifier of the cell in which the terminal currently resides; or the TDD uplink and downlink configuration in the TDD system.

22. The apparatus of claim 21, wherein the determiner is further configured to obtain the available subband set according to received offset information and/or bitmap information of available subbands sent by an eNB,
wherein the determiner is further configured to determine the available subband set according to the offset information and a number of the available subbands comprised in the available subband set.

23. The apparatus of claim 21, wherein the determiner is further configured to determine the specified PRB according to a PRB position of a UE before latest frequency hopping.

24. The apparatus of claim 21, wherein the communicator is further configured to send the uplink information by the communicator on the specified PRB according to the frequency hopping pattern, or receive or detect the downlink information by the communicator on the specified PRB according to the frequency hopping pattern as follows:
the frequency hopping pattern of the uplink data and the frequency hopping pattern of the uplink control information include a same frequency domain frequency hopping rule, or
the frequency hopping pattern of the uplink data and the frequency hopping pattern of a PRACH include a same frequency domain frequency hopping rule, or
the frequency hopping pattern of the uplink control information and the frequency hopping pattern of the PRACH include a same frequency domain frequency hopping rule, or
the frequency hopping pattern of the downlink control information and the frequency hopping pattern of the downlink data include a same frequency domain frequency hopping rule, or
the frequency hopping pattern of the downlink control information and the frequency hopping pattern of the downlink data excluding one or more system information blocks (SIBs) include a same frequency domain frequency hopping rule; and
in the TDD system, the frequency hopping pattern for sending the downlink information and the frequency hopping pattern for sending the uplink information are the same.

25. The apparatus of claim 21, wherein frequency hopping occurs in the frequency hopping pattern in at least one of the following subframes:
in the TDD system, in the frequency hopping pattern, the frequency hopping occurs in an uplink/downlink switching subframe;
in the frequency hopping pattern, the frequency hopping occurs in a subframe determined by the cell identifier of the cell in which the terminal currently resides; or
in the frequency hopping pattern, the frequency hopping occurs in a subframe outside the available subband set.

26. The apparatus of claim 21, wherein in the frequency hopping pattern, a subband where the specified PRB is located before frequency hopping and a subband where the specified PRB is located after the frequency hopping satisfy at least one of the following:
a sum of an index of the subband where the specified PRB is located before the frequency hopping and an index of the subband where the specified PRB is located after the frequency hopping is a fixed value;
the index of the subband where the specified PRB is located after the frequency hopping is: (the index of the subband where the specified PRB is located before the frequency hopping+a constant) mod a number of available subbands in the available subframe set;
the index of the subband where the specified PRB is located after the frequency hopping is: (the index of the subband where the specified PRB is located before the frequency hopping+a frequency hopping factor) mod the number of the available subbands in the available subframe set;
the index of the subband where the specified PRB is located after the frequency hopping is calculated from a preset interleaving function executed on the index of the subband where the specified PRB is located before the frequency hopping; or a sum of the index of the subband where the specified PRB is located and 1 is: [(the index of the subband where the specified PRB is located before the frequency hopping +1)×a constant c] mod a fixed value, wherein the fixed value is ($N_{sb}$+1), $N_{sb}$ denotes the number of the available subbands in the available subframe set, and c is relatively prime to $N_{sb}$,
wherein the index of the subband is an index after the subbands in the available subframe set are numbered from 0 according to a preset sequence.

27. The apparatus of claim 21, wherein in the frequency hopping pattern, the specified PRB before frequency hopping and the specified PRB after the frequency hopping satisfy at least one of the following:
a sum of an index of the specified PRB after the frequency hopping and an index of the specified PRB before the frequency hopping is: (an index of the specified PRB before the frequency hopping mod $N_{RB}^{sb}$)×2+a number of PRBs comprised in ($N_{sb}$−1) subbands, wherein $N_{RB}^{sb}$ denotes the number of PRBs comprised in a subband and $N_{sb}$ denotes a number of available subbands in the available subframe set;
a sum of the index of the specified PRB after the frequency hopping and the index of the specified PRB before the frequency hopping is a constant;
the index of the specified PRB after the frequency hopping is: (the index of the specified PRB before the frequency hopping+a constant) mod a number of PRBs comprised in the available subbands in the available subframe set;
the index of the specified PRB after the frequency hopping is: (the index of the specified PRB before the frequency hopping+a frequency hopping factor) mod the number of the PRBs comprised in the available subbands in the available subframe set;
a difference between the index of the specified PRB after the frequency hopping and the index of the specified PRB before the frequency hopping is: (a first value−a number calculated from a preset interleaving function executed on the first value)×$N_{RB}^{sb}$, wherein the first value is the index of the specified PRB before the frequency hopping divided by $N_{RB}^{sb}$ and then rounded down;
a difference between the index of the specified PRB after the frequency hopping and the index of the specified PRB before the frequency hopping is: (a second value−a number calculated from the preset interleaving function executed on the second value)×$N_{RB}^{sb}$, wherein the second value is the index of the specified PRB before the frequency hopping divided by $N_{RB}^{sb}$ and then rounded down; or
the index of the specified PRB after the frequency hopping is: (a third value−a fourth value)×$N_{RB}^{sb}$, wherein the third value is the index of the specified PRB before the frequency hopping divided by $N_{RB}^{sb}$ and then rounded down, the fourth value is: [(the third value+1)×c] mod a fixed value−1, the fixed value is ($N_{sb}$+1), and c is relatively prime to $N_{sb}$,
wherein the index of the PRB is an index after the PRBs in the available subframe set are numbered from 0 according to a preset sequence.

28. The apparatus of claim 21, wherein in a subframe for sending a PRACH, in response to determining that a PRB position corresponding to the frequency hopping pattern for sending the uplink data coincides or coincides in part with frequency domain resources of the PRACH, the communicator is further configured to hop to another available subband and sends the uplink data, or does not send the uplink data in the subframe for sending the PRACH.

29. The apparatus of claim 21, wherein in a subframe for sending a system information block (SIB) and/or a physical broadcast channel and/or a paging message and/or downlink control information for scheduling the paging message, in response to determining that the specified PRB corresponding to the frequency hopping pattern for sending the downlink data coincides or coincides in part with a PRB or a subband where the SIB or PBCH or Paging is located, the communicator is further configured to hop to another available subband and sends the downlink data, or does not send the downlink data.

30. The apparatus of claim 21, wherein in the TDD system,
in response to determining that sending the uplink data or the uplink control information according to the frequency hopping pattern, the communicator does not receive the downlink control information, or hops to a same narrowband as a PUSCH/PUCCH and receives an EPDCCH.

31. The apparatus of claim 21, wherein in response to determining that sending a non-contention PRACH according to the frequency hopping pattern, the communicator does not receive the downlink control information, or hops to a same narrowband as the PRACH and receives the downlink control information.

32. The apparatus of claim 21, wherein a change cycle of a redundancy version (RV) and/or a scrambling sequence of the downlink information or the uplink information of the communicator is Z subframes.

33. An information transmission apparatus, comprising:
a second determiner configured to determine a frequency hopping pattern; and a second communicator configured to send downlink information on a specified physical resource block (PRB) according to the frequency hopping pattern, or receive or detect uplink information on the specified PRB according to the frequency hopping pattern,
wherein the frequency hopping pattern is determined according to at least one of the following:
a time domain frequency hopping granularity; an available subframe set; an available subband set;
a time division duplex (TDD) uplink and downlink configuration; a number of PRBs comprised in each available subband; or a cell identifier of a cell in which a terminal currently resides, wherein in a TDD system, the time domain frequency hopping granularity is an uplink/downlink switching period or an integral multiple of the uplink/downlink switching period; wherein the time domain frequency hopping granularity is determined according to at least one of the following:
a number of repetitions corresponding to a lowest repetition level of the uplink information or the downlink information;
a number of repetitions corresponding to a repetition level of the uplink information or the downlink information;
a number of repetitions corresponding to a lowest repetition level of an uplink channel or a downlink channel with a smallest number of repetitions among an uplink channel or a downlink channel that uses a same frequency hopping pattern;
a number of repetitions of one repeated transmission and a number of frequency hopping subbands of the one repeated transmission;
the cell identifier of the cell in which the terminal currently resides; or
the TDD uplink and downlink configuration in the TDD system.

* * * * *